(12) United States Patent
Zhai et al.

(10) Patent No.: US 7,411,688 B1
(45) Date of Patent: Aug. 12, 2008

(54) METHOD AND SYSTEM FOR LASER INTENSITY CALIBRATION IN A THREE-DIMENSIONAL MULTI-COLOR LASER SCANNING SYSTEM

(75) Inventors: Yongjian Zhai, Mississauga (CA); Daniel James Arnold, Milton (CA); John D. Bell, Toronto (CA); Tina Malik, Markham (CA)

(73) Assignee: Arius3D Inc., Mississauga, Ontario (CA)

( * ) Notice: Subject to any disclaimer, the term of this patent is extended or adjusted under 35 U.S.C. 154(b) by 136 days.

(21) Appl. No.: 11/384,082

(22) Filed: Mar. 17, 2006

(51) Int. Cl.
*G01B 11/24* (2006.01)
(52) U.S. Cl. .................................................. 356/601
(58) Field of Classification Search ................ 356/319, 356/402, 405, 406, 408, 421, 422, 423, 425, 356/445–448; 250/226
See application file for complete search history.

(56) References Cited

U.S. PATENT DOCUMENTS

| | | | | |
|---|---|---|---|---|
| 4,839,722 | A | * | 6/1989 | Barry et al. ................ 358/523 |
| 5,374,988 | A | * | 12/1994 | Wertz et al. ................ 356/328 |
| 5,491,568 | A | | 2/1996 | Wan |
| 5,493,321 | A | * | 2/1996 | Zwadlo ...................... 347/131 |
| 5,583,666 | A | | 12/1996 | Ellson et al. |
| 5,668,631 | A | | 9/1997 | Norita et al. |
| 5,675,407 | A | | 10/1997 | Geng |
| 5,809,366 | A | | 9/1998 | Yamakawa et al. |
| 5,988,862 | A | | 11/1999 | Kacyra et al. |
| 6,028,672 | A | | 2/2000 | Geng |
| 6,141,105 | A | | 10/2000 | Yahashi et al. |
| 6,147,760 | A | | 11/2000 | Geng |
| 6,151,118 | A | | 11/2000 | Norita et al. |
| 6,246,468 | B1 | | 6/2001 | Dimsdale |
| 6,252,623 | B1 | | 6/2001 | Lu et al. |
| 6,330,523 | B1 | | 12/2001 | Kacyra et al. |
| 6,341,016 | B1 | | 1/2002 | Malione |
| 6,420,698 | B1 | | 7/2002 | Dimsdale |

(Continued)

OTHER PUBLICATIONS

Rejean Baribeau, Marc Rioux and Guy Godin, Color reflectance Modeling Using a PolyChromatic Laser Range Sensor, IEEE Transactions on Pattern Analysis and Machine Intelligence, V. 14, No. 2, Feb. 1992, pp. 263-269. NRC 31770.

(Continued)

*Primary Examiner*—Tarifur R. Chowdhury
*Assistant Examiner*—Isiaka O Akanbi
(74) *Attorney, Agent, or Firm*—Stephen C. Glazier; K & L Gates LLP

(57) ABSTRACT

According to an embodiment, a method and system for color calibration in a three-dimensional multi-color laser scanning system is disclosed. An object may be scanned with the scanning system, which scans the object with color laser heads. Laser intensities, corresponding to laser intensity values, may be received from the scanned object. Three different calibration targets are used to setup a field of view (FOV) calibration profile due to scanning position changes, a surface normal calibration profile due to surface normal direction changes, and a color reflectance calibration profile due to color reflectance changes. After compensating for laser power drift fluctuations, the laser intensity values may be further compensated for field of view scanning position changes and surface normal direction changes using the field of view calibration profile and surface normal calibration profile. Color values of each point scanned from the object may be calculated using compensated laser intensity values from the color reflectance profile.

30 Claims, 21 Drawing Sheets

U.S. PATENT DOCUMENTS

| | | |
|---|---|---|
| 6,473,079 B1 | 10/2002 | Kacyra et al. |
| 6,512,518 B2 | 1/2003 | Dimsdale |
| 6,529,280 B1 | 3/2003 | Yahashi et al. |
| 6,549,288 B1 | 4/2003 | Migdal et al. |
| 6,553,138 B2 | 4/2003 | Rozin |
| RE38,180 E | 7/2003 | Edge |
| 6,636,310 B1 | 10/2003 | Ben-Dov et al. |
| 6,677,956 B2 | 1/2004 | Raskar et al. |
| 6,700,669 B1 | 3/2004 | Geng |
| 6,840,597 B1 | 1/2005 | Wilson et al. |
| 6,847,462 B1 | 1/2005 | Kacyra et al. |
| 6,851,785 B2 | 2/2005 | Wu et al. |
| 6,911,995 B2 | 6/2005 | Ivanov et al. |
| 6,930,681 B2 | 8/2005 | Raskar et al. |
| 6,937,348 B2 | 8/2005 | Geng |
| 6,962,289 B2 | 11/2005 | Vatan et al. |
| 6,983,082 B2 | 1/2006 | Duiker |
| 6,985,145 B2 | 1/2006 | Knighton et al. |
| 2001/0016063 A1 | 8/2001 | Albeck et al. |
| 2003/0164952 A1 | 9/2003 | Deichmann et al. |
| 2003/0223083 A1 | 12/2003 | Geng |
| 2005/0180662 A1 | 8/2005 | Hoffman et al. |

OTHER PUBLICATIONS

J-A Beraldin, L. Cournoyer, M. Rioux, F. Blais, S.F.El-Hakim and G. Godin, Object model creation from multiple range images: Acquisition, Calibration, Model Building and Verification, Proceedings of the International Conference on Recent Advances in 3-D Digital Imaging and Modeling Ottawa. Ont. May 12-15, 1997. pp. 326-333 NRC 40169.

J.-A. Beraldin, M. Rioux, F. Blais and G. Godin, Model-based Calibration of a Range Camera, Proceedings of the 11$^{th}$ International Conference on Pattern Recognition, The Hague, The Netherlands, Aug. 30—Sep. 3, 1992, pp. 163-167. NRC 33205.

J.-A. Beraldin, M. Rioux, F. Blais, G. Godin and R. Baribeau, Calibratoin of an Auto-synchronized Range Camera with Oblique Planes and Collinearity Equation Fitting, NRC ERB-1041, Nov. 1994. 40 pages NRC Jan. 11, 1994.

Federico Bumbaca, Francois Blais and Marc Rioux, Real-time correction of three-dimensional monlinearities for a laser rangefinder, Optical Engineering, V. 25, No. 4, Apr. 1986.

\* cited by examiner

METHOD AND SYSTEM FOR LASER INTENSITY CALIBRATION IN A THREE-DIMENSIONAL MULTI-COLOR LASER SCANNING SYSTEM

BACKGROUND

1. Field

The present embodiments relate to methods and systems for calibrating laser intensities sampled by a three-dimensional multi-color laser scanning system. Specifically, the present embodiments relate to methods and systems for determining color values of scanned objects using information obtained from calibrating laser intensities in a three-dimensional multi-color laser scanning system.

2. Description of Related Art

Three-dimensional laser scanning systems are known in the art. For example, U.S. Pat. No. 5,231,470 issued to Koch and U.S. Pat. No. 6,480,287 issued to Lee et al. disclose three-dimensional scanning systems. Furthermore, various color calibration methods are known for other imaging devices, such as printers, copiers and flatbed scanners (e.g., see U.S. Pat. Nos. 5,809,366, 6,840,597 and 6,851,785). However, there currently does not exist an accurate method for calibrating colors in a three-dimensional multi-color laser scanning system.

Object intrinsic color value calculation has been a significant problem in scanning technology. Color values may be 25% off object intrinsic color values in conventional three-dimensional multi-color laser scanning systems. This error becomes even higher when an intrinsic color reflectance (expressed in a range of zero to one) is close to zero or one.

There are various explanations for the lack of accuracy in object intrinsic color calculation in conventional three-dimensional multi-color laser scanning systems. For example, conventional methods assume and implement a linear response between laser intensities and color reflectance, thereby causing a significant error in the calibrated color values, which may be as high as 24% off of true color values. Conventional methods also assume and implement a simple cosine response between laser intensities and reflection angles (angles between surface normal directions and lens detection direction), thereby causing significant over compensation when a reflection angle is near 0 degrees (e.g., 0-20 degrees), and under compensation when a reflection angle is near 90 degrees (e.g., 70-90 degrees). The resultant errors can be as high as 50% off of true color values. Additionally, calibration information in conventional methods is often obtained from scanning a single calibration target, such as a white flat bar, and no other calibration targets. This is often insufficient to establish a reliable correlation between color reflectance and laser intensities.

Accordingly, there is a need for a multi-colored three-dimensional laser scanner system for accurately capturing the intrinsic colors of scanned objects.

BRIEF DESCRIPTION OF THE DRAWINGS

The utility of the embodiments of the invention will be readily appreciated and understood from consideration of the following detailed description of the embodiments of this invention, when taken with the accompanying drawings, in which same numbered elements are identical or similar.

DETAILED DESCRIPTION

Overview

Figure 1:
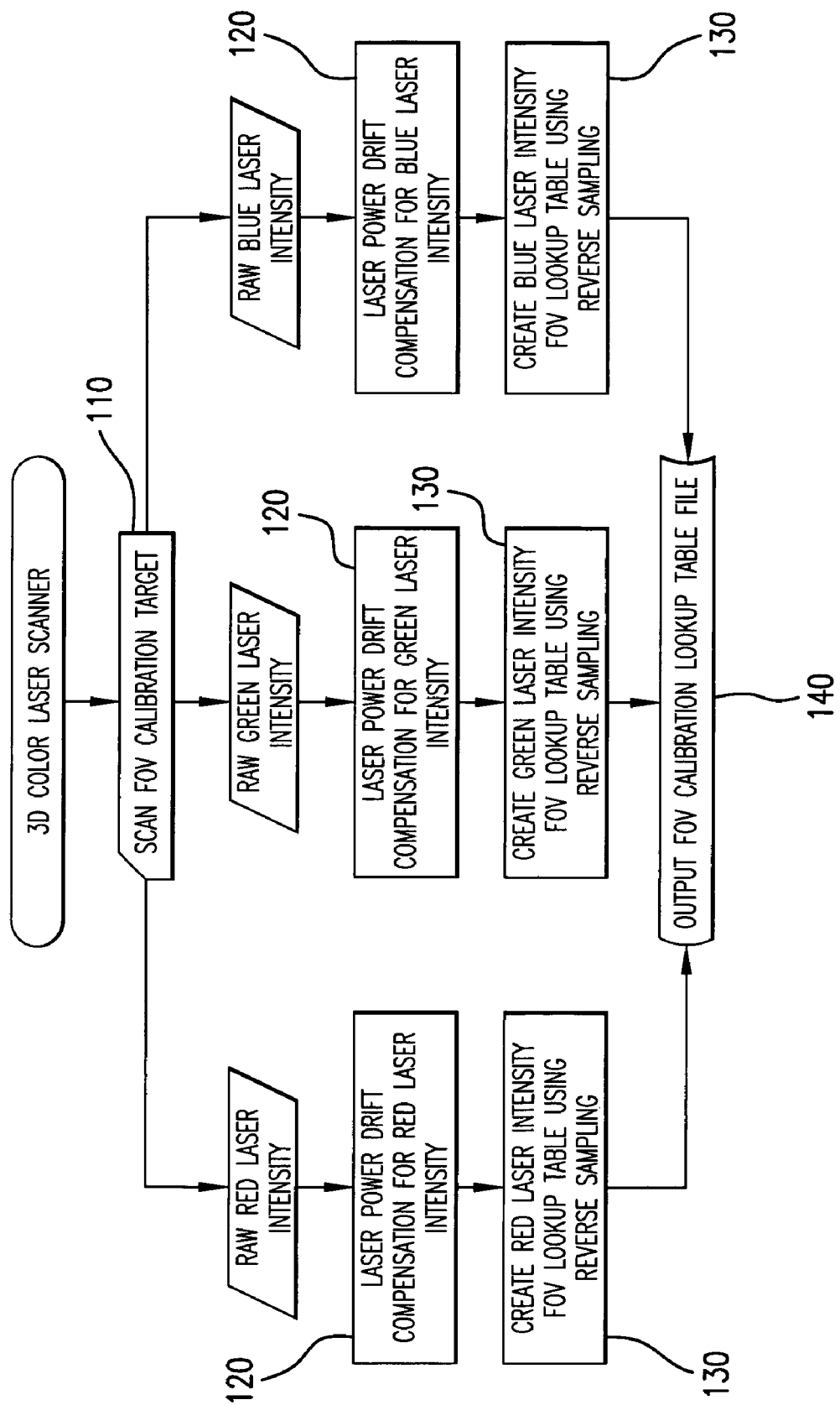
FIG. 1 illustrates a diagram of a method for creating a field of view (FOV) calibration look up table file according to one embodiment.

The present embodiments relate to methods and systems for calibrating laser intensities sampled by a three-dimensional multi-color laser scanning system. The present embodiments utilize conventional three-dimensional multi-color laser scanning hardware, but provide for superior processing of laser signals to achieve a superior digitized image of a scanned object, including more precise representation of the colors of the scanned object.

Three-dimensional multi-color laser scanning systems are known in the art, and detailed information regarding their design and operation are not recited herein. In general, an object may be scanned by lasers in a three-dimensional multi-color laser scanning system, which may include red, green and blue laser heads. The lasers may be emitted from the laser heads and directed at a plurality of scanning locations on the object, which may be manipulated in various positions by the scanning system. Laser intensities for each laser color reflected off the scanned object may then be received by one or more detectors of the scanning system for a plurality of scanning locations. The detected laser intensity values may then be used to determine color values for the scanned object.

The present embodiments use three different calibration targets—a color reflectance calibration target, a field of view (FOV) calibration target, and a surface normal calibration target—to recover losses of laser intensities caused by various factors. Conventional methods only use calibration information from scanning a single, white, flat bar to perform such a recovery. After the system is calibrated, the sampled laser intensities from an object may be used as an input to calculate color values using the calibration information to achieve near true colors of the digitized image of any scanned object.

The present embodiments do not assume any mathematical models for the response between laser intensities and object intrinsic reflectance properties. Instead, the present embodiments model this response by using reverse engineering from measurement data obtained from a standard, multi-steps, flat sheet, grayscale chart. Laser intensity-color reflectance profiles are thereby made available for mapping intensity values to reflectance values in a full color reflectance range. In contrast, conventional methods use a two points (black and white) method to do a linear color reflectance calibration.

The present embodiments also do not assume any mathematical models for the response between laser intensities and object surface normal directions. Instead, the present embodiments model this response by using reverse engineering from measurement data obtained from a white sphere target. Laser intensity-reflection angle profiles are thereby made available for a full range (0 to 90 degrees) recovery of laser intensity losses. In contrast, conventional methods merely assume a model of cosine of the reflection angle to provide the surface normal compensation.

Calibration Targets

For an object with a perfectly diffused surface (i.e., a Lambertian surface), laser intensity output may depend on four factors: object color reflectance, laser power fluctuations, coordinates of field of view (FOV) and surface normal directions. Compensation for the effects of these factors on laser intensity output may be achieved by using separate calibration processes on a three-dimensional multi-color laser scanning system. A separate calibration target may be used for each calibration process, as discussed below. The calibration processes may be performed separately from each other.

First, a white, flat bar coated with a spectrolon paint with a color reflectance value of 0.99 may be used as a FOV calibration target. The bar may be scanned in the full range of the FOV of the scanning system. After applying compensation for any laser power drift fluctuations affecting the output laser intensities, as discussed in further detail below, the values of the output laser intensities may be used to create a FOV calibration lookup table for each color laser head using a reverse sampling method.

Second, a standard multi-steps, flat sheet, grayscale chart may be used as a color reflectance calibration target. A subset of the output laser intensities from the grayscale chart may be selected from the center of each grayscale stripe after applying compensations for FOV and laser power drift fluctuations, both described in more detail below. The selected subset of the laser intensities may then be used to generate a color reflectance calibration profile for each color laser head using a polynomial least-square fit algorithm.

Third, a white sphere coated with barium sulphite paint may be used as a surface normal calibration target. Ideally, the white sphere should be painted with the same material and have the same color reflectance value as the FOV calibration target. The sphere may be scanned on half of its surface. After applying compensations for FOV and laser power drift fluctuations to the output laser intensities, the laser intensities may be sampled at 0.5 degree steps in a 0 to 90 degrees range according to the distributions of angles between the sphere surface normal directions and a vector of a lens detector in the scanning system. A polynomial least-square fit algorithm may then be used on the sampled data to generate a surface normal compensation profile for each color laser head.

Operation

FIG. 1 illustrates a diagram of a method for creating a field of view (FOV) calibration look up table file according to one embodiment. In 110, a FOV calibration target may be scanned in such a way that a full range of FOV of the scanning system is covered. In one embodiment, the FOV calibration target may be, for example, a white, flat bar coated with spectrolon paint.

In 120, laser power drift compensation may be applied to output laser intensity values from red, green and blue laser heads of the scanning system to compensate for any effects of fluctuations in laser power during the scanning process. Laser power drift compensation may be determined by using a linear regression fit analysis. For example, for each scan line, a laser power response may be additionally recorded by scanning a small white cube coated with the same paint as the FOV calibration target. Experiments show that this response is linear due to the laser power drift. Therefore, a linear regression fit for such compensation may be utilized.

An exemplary method and algorithm for laser power drift compensation is described below. For example, a small 8 mm×8 mm white cube coated with the same material as the FOV calibration target may be used to monitor any laser power drifts on each scan line. Experiments show that this drift is in the magnitude of 2 to 5% during a day operation, and the drift may cause a linear response to the reflected laser intensities. Each measured point may contain red, green and blue laser intensities recorded from the small white cube. By comparing changes between these intensities and a maximum white laser intensity, a drift compensation value may be obtained.

The following pseudo code demonstrates an example of an algorithm for laser power drift compensation:

```
function LaserPowerDriftCompensatoin (point cloud pointCloud[in, out])
{
    // Loop through each point, get its recorded white cube laser
    // intensities, and then find a linear regression fit between the
    // black laser intensity and the white laser intensity at the
    // recorded white cube laser intensity
    FOR i = 1 to pointCloud.numberPoints
        GET aPoint from pointCloud[i]
        // Laser power drift compensation for red laser intensity
        // Find a linear regression fit by finding parameters a and b
```

-continued

```
        CALL FindLinearRegressionFit   (blackIntensity.red[in],
                                        whiteIntensity.red[in],
                                        aPoint.whiteCubeIntensity.red
                                          [in],
                                        a[out], b[out])
        // Compensate laser power drifting by performing y = ax + b
        CALL CompensateLaserPowerDrift (aPoint.redIntensity[in,
                                        out], a[in], b[in])
        // Laser power drift compensation for green laser intensity
        // Find a linear regression fit by finding parameters a and b
        CALL FindLinearRegressionFit   (blackIntensity.green[in],
                                        whiteIntensity.green[in],
                                        aPoint.whiteCubeIntensity.green[in],
                                        a[out], b[out])
        // Compensate laser power drifting by performing y = ax + b
        CALL CompensateLaserPowerDrift (aPoint.redIntensity[in,
                                        out], a[in], b[in])
        // Laser power drift compensation for blue laser intensity
        // Find a linear regression fit by finding parameters a and b
        CALL FindLinearRegressionFit   (blackIntensity.blue[in],
                                        whiteIntensity.blue[in],
                                        aPoint.whiteCubeIntensity.blue[in],
                                        a[out], b[out])
        // Compensate laser power drifting by performing y = ax + b
        CALL CompensateLaserPowerDrift (aPoint.redIntensity[in,
                                        out], a[in], b[in])
    ENDFOR
}
```

In 130, a reverse sampling algorithm may then be applied to the output laser intensity values to create a FOV indexed lookup table for each of the red, green and blue laser intensities.

An exemplary method and algorithm of reverse sampling for creating a FOV calibration lookup table is described below. For example, a three-dimensional laser scanner system may define a scanning area where data on the surface of a physical object may be sampled. This scanning area may be described in terms of UV coordinates, where U is in the scan line direction (corresponding to the Y-axis in a Cartesian coordinate system), and V is in the measurement distance direction (corresponding to the Z-axis in a Cartesian coordinate system). The laser intensity reflected from the object surface changes according to the change of UV coordinates. Generally, the shorter the distance traveled by the reflected lasers, the stronger the laser intensities.

Therefore, a maximum laser intensity value can be obtained from a point in the UV coordinate system corresponding to the shortest reflected distance. The laser intensity corresponding to this point may be used as the color reflectance response of the FOV calibration target. Since the color reflectance of the FOV calibration target is 0.99, which is nearly a full reflectance value of 1.0, the maximum laser intensity value may reasonably represent the intensity of a pure white, and well diffused, object. Therefore, the maximum laser intensity value may correspond to a "white laser intensity". Any offset of a laser intensity observed at a UV coordinate (u, v) on the FOV calibration target thus represents the UV compensation value for that coordinate. Therefore, all of the offsets for each UV coordinate may be calculated in order to compensate for the influence of UV coordinate changes on laser intensities. For example, the target may be sampled in the full FOV range by vertically scanning the target in order to obtain all data which reflects laser intensity changes at each UV coordinate. The data sampled from the target may then be quantified in both the Y and Z-axis directions to set up a rectangular UV lookup table for each color laser head. Then for each coordinate represented in the table, a laser intensity value may be obtained by calculating an average laser intensity value from the closest points in the input point cloud using a standard Kd-tree (k-dimensional tree) search algorithm. An advantage of using a reverse sampling method, as opposed to a forward sampling method, is that the UV look up table is hole-free.

The following pseudo code demonstrates an example of an algorithm for creating the FOV calibration lookup table:

```
function SetupFOVLookupTable (point cloud redPointCloud[in],
                             point cloud greenPointCloud[in],
                             point cloud bluePointCloud[in],
                             sampling step in U uStep[in],
                             sampling step in V vStep[in],
                             maximum iteration number maxNumIters[in],
                             maximum neighbors maxNumNeighbors[in],
                             UV lookup table redUvLookupTable[out],
                             UV lookup table greenUvLookupTable[out],
                             UV lookup table blueUvLookupTable[out])
{
    // First quantize the input point clouds to setup a rectangle UV
    // table by calculating number of samples in U and V directions
    CALL CalculateSamplingSize (nu[out], nv[out])
    // Then calculate laser intensities from each input point cloud and
    // fill in its corresponding lookup table
    CALL FillLookupTable   (redPointCloud[in], nu[in], nv[in],
                            MaxNumIters, maxNumNeighbors,
                            redUvLookupTable[out])
    CALL FillLookupTable   (greenPointCloud[in], nu[in], nv[in],
                            maxNumIters, maxNumNeighbors,
                            greenUvLookupTable[out])
    CALL FillLookupTable   (bluePointCloud[in], nu[in], nv[in],
                            maxNumIters, maxNumNeighbors,
                            blueUvLookupTable[out])
}
function FillLookupTable   (point cloud pointCloud[in],
                            number samples in U nu[in],
                            number samples in V nv[in],
                            maximum iteration number maxNumIters[in],
                            maximum neighbors maxNumNeighbors[in],
                            UV lookup table uvLookupTable[out])
{
    // First create Kd-tree for pointCloud
    CALL CreateKdTree (pointCloud[in], kdTree[out])
    FOR v = 1 to nv
        FOR u = 1 to nu
            // Then use Kd-tree search to iteratively find closest
            // points from pointCloud for a query quantized UV
            // coordinate
            CALL SearchForClosestPoints(pointCloud[in],
                                         maxNumIters[in],
                                         u, v,
                                         closestPointList[out])
            // If total number of points in closestPointList is larger
            // than maxNumNeighbors, only retain maxNumNeighbors
            // points in the list with smallest distances to the query UV
            // coordinate
            IF closestpointList.size > maxNumNeighbors THEN
                CALL FilterClosestPoints(closestPointList[in, out])
            ENDIF
            // Average laser intensities from all points in
            // closestPointList
            CALL CalculateAverageIntensity(closestPointList[in],
                                           averageIntensity[out])
            // Set averageIntensity to the table at u and v
            CALL SetIntensity(u[in], v[in],
                              averageIntensity[in], uvLookupTable[out])
        ENDFOR
    ENDFOR
}
```

In 140, a FOV calibration look up table file may be output for all three laser colors, which may then be used to compensate for the influence of scanning position changes in the FOV range. FOV compensation may be achieved by using a linear regression fit analysis. A laser intensity value from the FOV calibration lookup table may obtained for a given scanning position expressed in FOV coordinates. A linear regression fit equation may be obtained by using the laser intensity value from the FOV calibration lookup table and the highest average intensity value from the FOV calibration target. A FOV compensated laser intensity value may be calculated by applying the linear regression fit equation to an output laser intensity value.

An exemplary method and algorithm for FOV compensation is described below. For example, once FOV lookup tables are set up for each color laser head, the tables may be used to compensate for FOV influence on reflected laser intensities.

Since laser intensities measured from an object may be reflected from a surface where the color reflectance is different from the FOV calibration target, the measured intensities between a white laser intensity and a black laser intensity (the black laser intensity is obtained, in contrast to the white laser intensity, by moving the laser head outside the FOV range, and then taking a measurement) may be linearly scaled. A black target cannot be used with the laser head, since no reflected lights may be detected. Since the laser head is outside of the FOV range, the recorded intensities can be regarded as laser response from black color reflectance.

The following pseudo code demonstrates an example of an algorithm for FOV compensation:

```
function DoFOVCompensation (point cloud pointCloud[in],
                            black laser intensity blackIntensity[in],
                            white laser intensity whiteIntensity[in],
                            UV lookup table redUvLookupTable[out],
                            UV lookup table greenUvLookupTable[out],
                            UV lookup table blueUvLookupTable[out])
{
    // Loop through each point with a UV coordinate of (u, v) in
    // pointCloud, find a linear regression fit between the black
    // laser intensity and the white laser intensity at the (u, v) on
    // the lookup table
    FOR I = 1 to pointCloud.numberPoints
        GET aPoint from pointCloud[i]
        // Compensate FOV for red laser intensity
        CALL GetWhiteIntensityFromLookupTable(aPoint.u[in],
                                              aPoint.v[in],
                                              redUvLookupTable[in],
                                              intensityAtUv[out])
        // Find a linear regression fit by finding parameters a and b
        CALL FindLinearRegressionFit(blackIntensity.red[in],
                                     whiteIntensity.red[in],
                                     intensityAtUv.red[in],
                                     a[out], b[out])
        // Compensate FOV by performing y = ax + b
        CALL CompensateFOV(aPoint.redIntensity[in, out], a[in], b[in])
        // Compensate FOV for green laser intensity
        CALL GetWhiteIntensityFromLookupTable(aPoint.u[in],
                                              aPoint.v[in],
                                              greenUvLookupTable[in],
                                              intensityAtUv[out])
        // Find a linear regression fit by finding parameters a and b
        CALL FindLinearRegressionFit(blackIntensity.green[in],
                                     whiteIntensity.green[in],
                                     intensityAtUv.green[in],
                                     a[out], b[out])
        // Compensate FOV by performing y = ax + b
        CALL CompensateFOV(aPoint.greenIntensity[in, out], a[in],
                           b[in])
        // Compensate FOV for blue laser intensity
        CALL GetWhiteIntensityFromLookupTable(aPoint.u[in],
                                              aPoint.v[in],
                                              blueUvLookupTable[in],
                                              intensityAtUv[out])
        // Find a linear regression fit by finding parameters a and b
        CALL FindLinearRegressionFit(blackIntensity.blue[in],
                                     whiteIntensity.blue[in],
                                     intensityAtUv.blue[in],
                                     a[out], b[out])
        // Compensate FOV by performing y = ax + b
        CALL CompensateFOV(aPoint.blueIntensity[in, out], a[in],
                           b[in])
    ENDFOR
}
```

Figure 2:
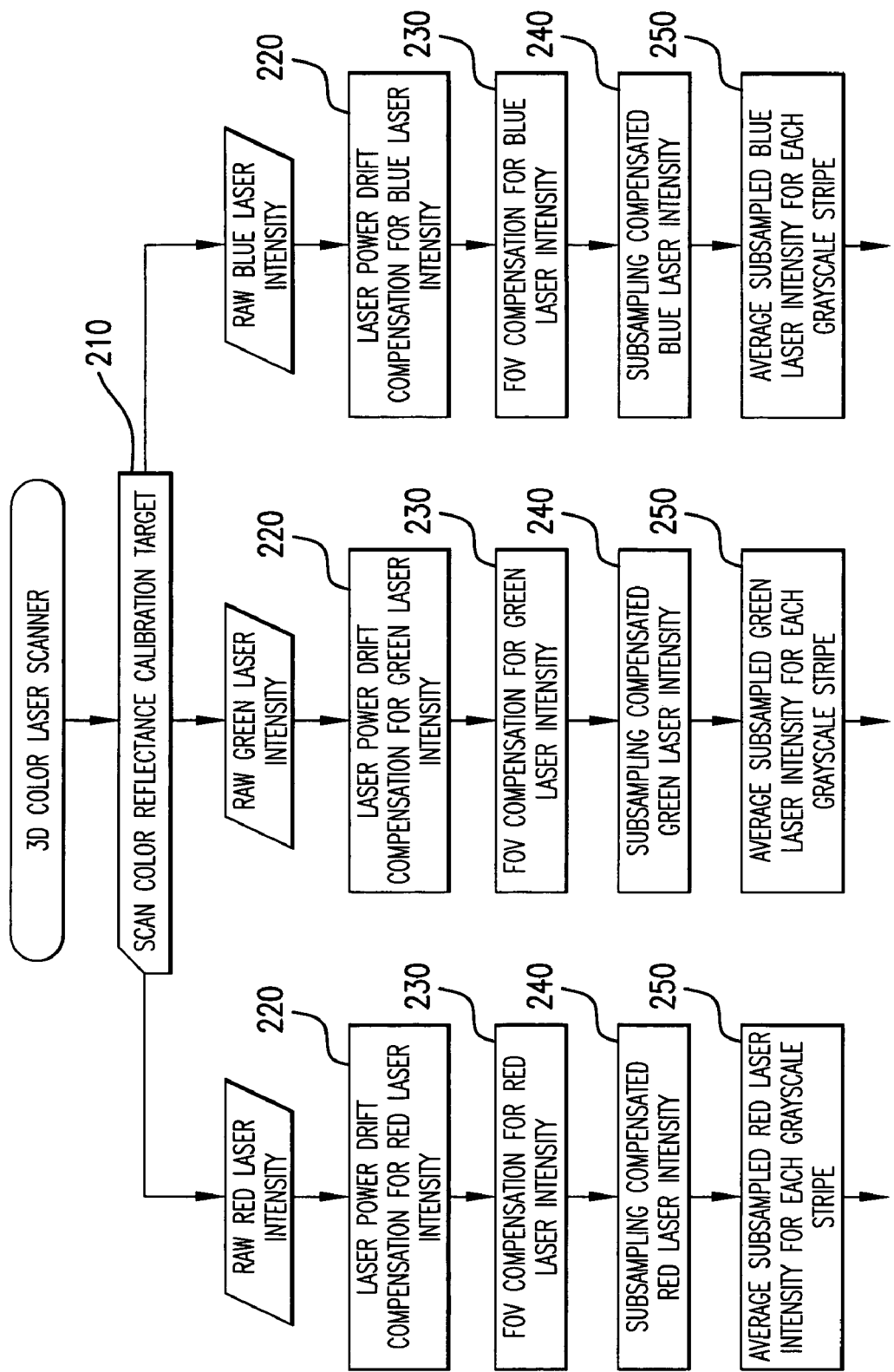
FIG. 2 illustrates a diagram of a method for creating a laser intensity-color reflectance calibration profile according to one embodiment.
Figure 2:
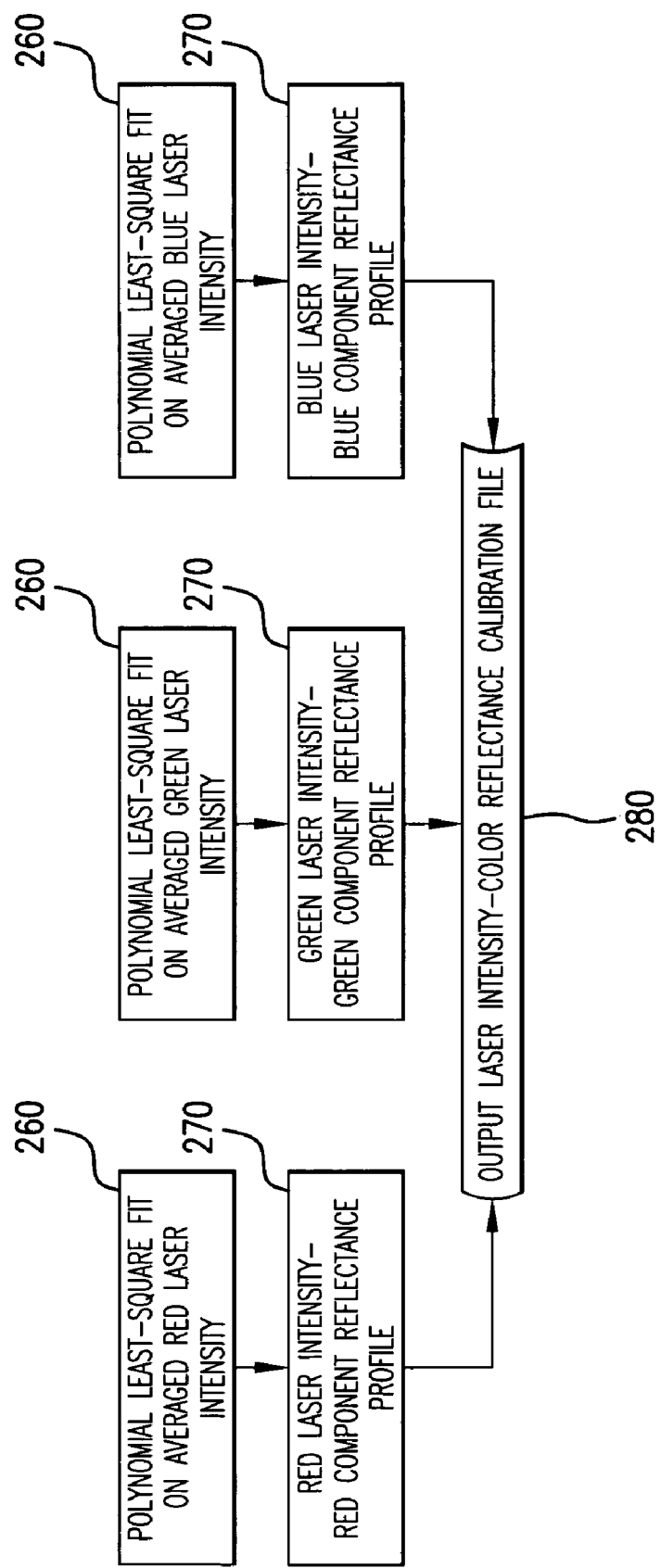

FIG. 2 illustrates a diagram of a method for creating a laser intensity-color reflectance calibration profile according to one embodiment. In 210, a color reflectance calibration target may be scanned by a scanning system. In one embodiment, the color reflectance calibration target may be, for example, a commercially available standard 31-steps, flat sheet, grayscale chart.

In 220 and 230, output laser intensity values from red, green and blue laser heads of the scanning system may be applied with laser power drift compensation and FOV compensation, as discussed above, to compensate for influences from any fluctuations in laser power and scanning position changes in the FOV range.

In 240, output laser intensity values from each stripe in the grayscale chart may then be sub-sampled from the center of each grayscale stripe to guarantee the highest possible quality data. In 250, the sub-sampled output laser intensity values from each grayscale stripe may be averaged. These averaged laser intensity values may be used as the responses of the laser intensity to the color reflectance of the grayscale chart. In 260 and 270, an optimized and automatic polynomial least-square-fit algorithm may be applied to the averaged output laser intensity values for each color laser to obtain laser intensity-color reflectance calibration profiles for each of the red, green and blue laser heads. In 280, an output laser intensity-color reflectance calibration profile may be output for all three laser colors.

An exemplary method and algorithm for generating color reflectance calibration profiles is described below. For example, the color reflectance calibration target may have 31 grayscale steps with a color reflectance range from 0.031 to 0.9 (in a 0 to 1 scale). Each grayscale step in the color reflectance calibration target may have a physical size of 40 mm×10 mm, and may be scanned individually and horizontally with a center of a laser head above the center of each grayscale step. In this scanning configuration, the highest quality data may be obtained from an area around the center of each grayscale step. Therefore, points may be sub-sampled from the central area of each grayscale step, and used for calculating color reflectance calibration profiles.

A sub-sample size may be 6 mm (width)×6 mm (height)× depth, where depth may equal a point cloud's depth value in the Z-axis direction. Since the color reflectance calibration target does not cover a full color reflectance range, a white laser intensity value (i.e., assume a color reflectance value of 1) as well as a black laser intensity value (i.e., assume a color reflectance value of 0) may be added to make the laser color response include a full color reflectance range. The addition of the white laser intensity and black laser intensity values allows for calibrating color in the ranges from 0 to 0.031 and from 0.9 to 1.

Color reflectance profiles may be set up in such a way that the X-axis represents intensities and the Y-axis represents target color reflectance values. For the purpose of convenience, grayscale values in RGB space may be used to represent the color reflectance values.

The following pseudo code demonstrates an example of an algorithm for generating color reflectance calibration profiles:

```
function MakeColorReflectanceCalibrationProfiles (
    point cloud pointCloud[in],
    x sub-sample size xSize[in],
    y sub-sample size ySize[in],
    z sub-sample size zSize[in],
    red laser color reflectance profile redReflectanceProfile[out],
    green laser color reflectance profile greenReflectanceProfile[out],
    blue laser color reflectance profile blueReflectanceProfile[out])
{
    // Loop through each grayscale step in pointCloud and sub-sample
    // points from its central area
    FOR i = 1 to numberOfGrayscaleSteps
        CALL ConstructSearchBox(xSize[in], ySize[in], zSize[in],
                                search bounding box bbox[out])
        // Use Kd-tree to find all points fallen into bbox from the
        // query grayscale step
        CALL SearchForAllPointsIn(pointCloud.kdTree[in], bbox[in],
                                list of points pointList[out])
        // Calculate average intensities for red, green and blue lasers
        CALL CalculateAverageIntensities(pointList[in],
                                    averageRedIntensity[out],
                                    averageGreenIntensity[out],
                                    averageBlueIntensity[out])
        // Make three lists to store averaged laser intensities
        MAKE red laser intensity list redLaserIntensityList
        MAKE green laser intensity list greenLaserIntensityList
        MAKE blue laser intensity list blueLaserIntensityList
        // Add averaged intensities into list
        ADD averageRedIntensity to redLaserIntensityList
        ADD averageGreenIntensity to greenLaserIntensityList
        ADD averageBlueIntensity to blueLaserIntensityList
        // Add black and white laser intensities into list
        ADD blackRedLaserIntensity to redLaserIntensityList
        ADD blackGreenLaserIntensity to greenLaserIntensityList
        ADD blackBlueLaserIntensity to blueLaserIntensityList
        ADD whiteRedLaserIntensity to redLaserIntensityList
        ADD whiteGreenLaserIntensity to greenLaserIntensityList
        ADD whiteBlueLaserIntensity to blueLaserIntensityList
    ENDFOR
    // Use standard polynomial least-square fit to find color
    // reflectance profiles
    CALL FindRedLaserColorReflectanceProfile(
                redLaserIntensityList[in],
                targetRedReflectanceList[in],
                redReflectanceProfile[out])
    CALL FindRedLaserColorReflectanceProfile(
                greenLaserIntensityList[in],
                targetGreenReflectanceList[in],
                greenReflectanceProfile[out])
    CALL FindRedLaserColorReflectanceProfile(
                blueLaserIntensityList[in],
                targetBlueReflectanceList[in],
                blueReflectanceProfile[out])
}
```

Figure 3:
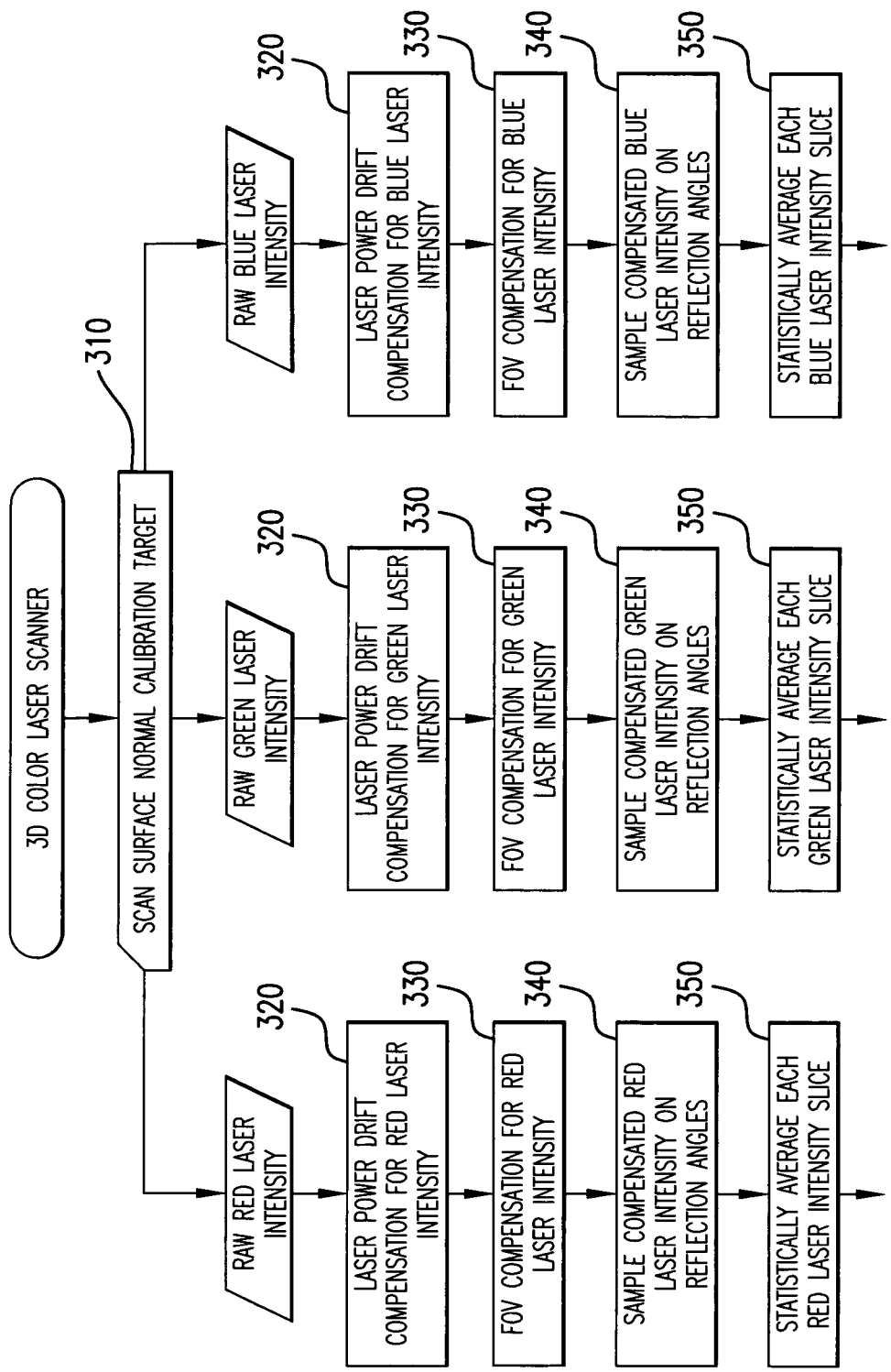
FIG. 3 illustrates a diagram of a method for creating a laser intensity-surface normal calibration profile according to one embodiment.
Figure 3:
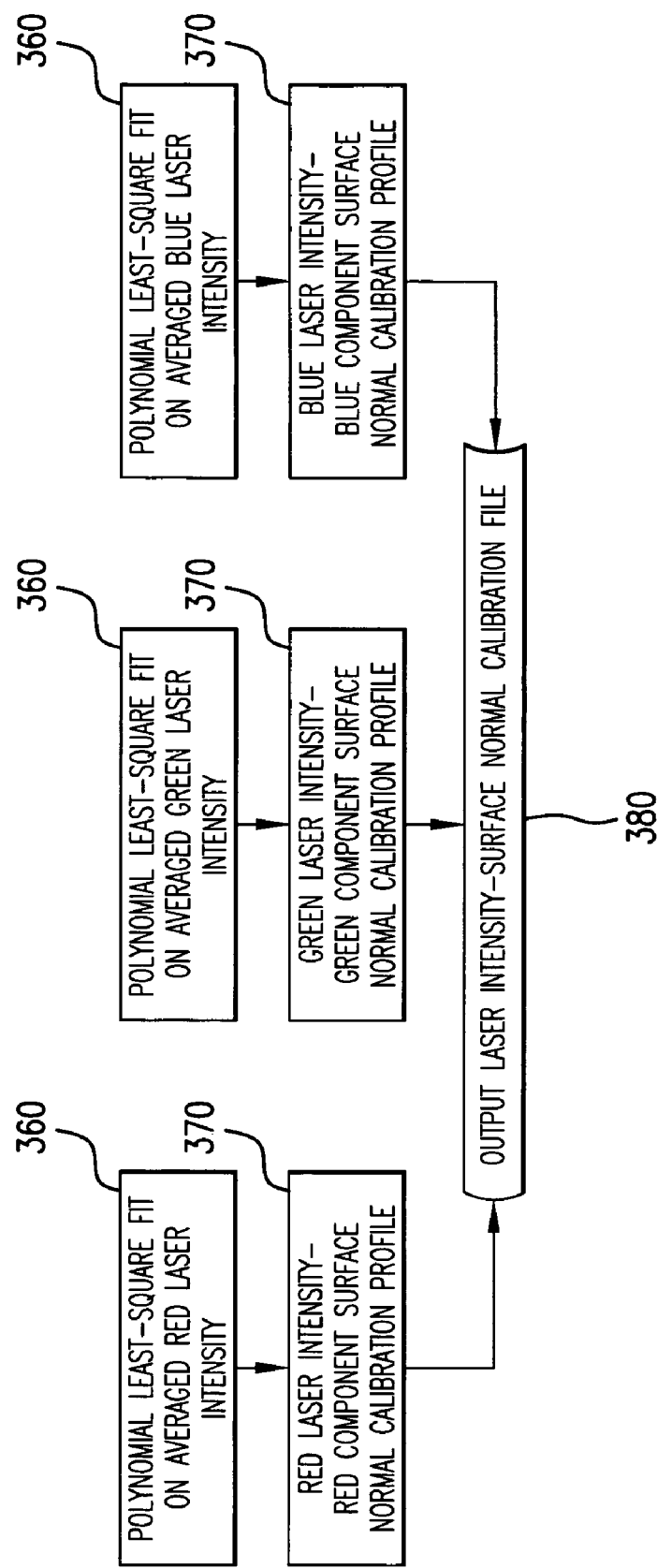

FIG. 3 illustrates a diagram of a method for creating a laser intensity-surface normal calibration profile according to one embodiment. In 310, a surface normal calibration target may be scanned by a scanning system. In one embodiment, the surface normal calibration target may be, for example, a white sphere coated with barium sulphite. In 320 and 330, output laser intensity values from red, green and blue laser heads of the scanning system may be applied with laser power drift compensation and FOV compensation to compensate for influences from any fluctuations in laser power and scanning position changes in the FOV range, as discussed above.

In 340, the output laser intensity values may then be sampled at 0.5 degree steps in a 0-90 degree reflection angle range of the surface normal calibration target. In 350, the output laser intensity values from each sampled range may be averaged to generate a representative laser intensity response to the surface normal direction changes for each laser color. In 360 and 370, an optimized and automatic polynomial least-square-fit algorithm may be applied to the averaged output laser intensity values to obtain laser intensity-surface normal calibration profiles for each of the red, green and blue laser heads. In 380, an output laser intensity-surface normal calibration profile may be output for all three laser colors.

An exemplary method for creating surface normal compensation profiles is described below. For example, the surface normal calibration target may be placed in a position close to the laser detection lens and with the center of the laser head above the center of the target. This measurement configuration generates the highest possible reflected laser intensities.

The surface normal calibration target may be scanned on its half surface to allow for creation of red, green and blue surface normal compensation profiles in a full surface normal direction range (0 to 90 degrees). Since no signals, or very weak signals, are detected on areas where angles between the detection lens vector and a surface normal direction are close or equal to 0 degrees, surface normal compensation profiles may be limited to a surface normal direction range from 0 to about 80 degrees.

Once the surface normal calibration target is scanned, a point cloud may be output from the scanning system. Laser power drift compensation and FOV compensation may first be applied to the point cloud, and then the sphere surface normal vectors may be transformed into the scanner coordinate system based on a scanner transformation matrix output from the scanning system. Points may then be sub-sampled at 0.5 degree steps according to the distributions of angles between the transformed sphere surface normal directions and the detection lens vector. The detection lens vector for a given measurement point on the sphere surface may be as follows:

$$DetectionLensVector = DetectionCenter - point.uvw$$

where DetectionCenter may represent the location of the detection lens in the scanner coordinate system. This location may be output by the scanning system. point.uvw may represent the location of that point in the scanning coordinate system.

The sub-sampling procedure may generate a list of 160 sub-sampled point clouds (snctPointCloudList[i]) having surface normal directions distributed in a 0.5 degree range. The point clouds may be arranged according to the increase of their surface normal direction values. Therefore, snctPointCloudList[1] would have a surface normal direction of 0 degrees, and snctPointCloudList[160] would have a surface normal direction of 80 degrees. Next, average red, green and blue intensity values may be calculated for each of the sub-sampled point clouds. These values may be used to represent the response of red, green and blue laser intensities to its surface normal direction (snctPointCloudList[i].averagedLaserIntensity).

Therefore, snctPointCloudList[1].averagedLaserIntensity should be free of any influences from surface normal directions. For a given snctPointCloudList[i], the difference between snctPointCloudList[i].averagedLaserIntensity and snctPointCloudList[1].averagedLaserIntensity should then represent a surface normal compensation value for snctPointCloudList[i].

In order to compensate for surface normal influences for any given measurement point on the surface of an object, surface normal compensation profiles may be calculated from snctPointCloudList by using the standard polynomial least-square fit algorithm for red, green and blue laser intensities, respectively. The X-axis in the profiles may represent angles (between the detection lens vector and surface normal vector in the scanner coordinate system), and the Y-axis in the profiles may represent reflected laser intensity values.

Laser intensity calibration may be a one-time process as long as (a) scanning system hardware configurations are not changed after the calibration and/or (b) laser power has not significantly decayed due to the shortening of laser life span. However, if (a) and/or (b) occurs, the laser intensity of the system may need to be recalibrated.

Figure 4:
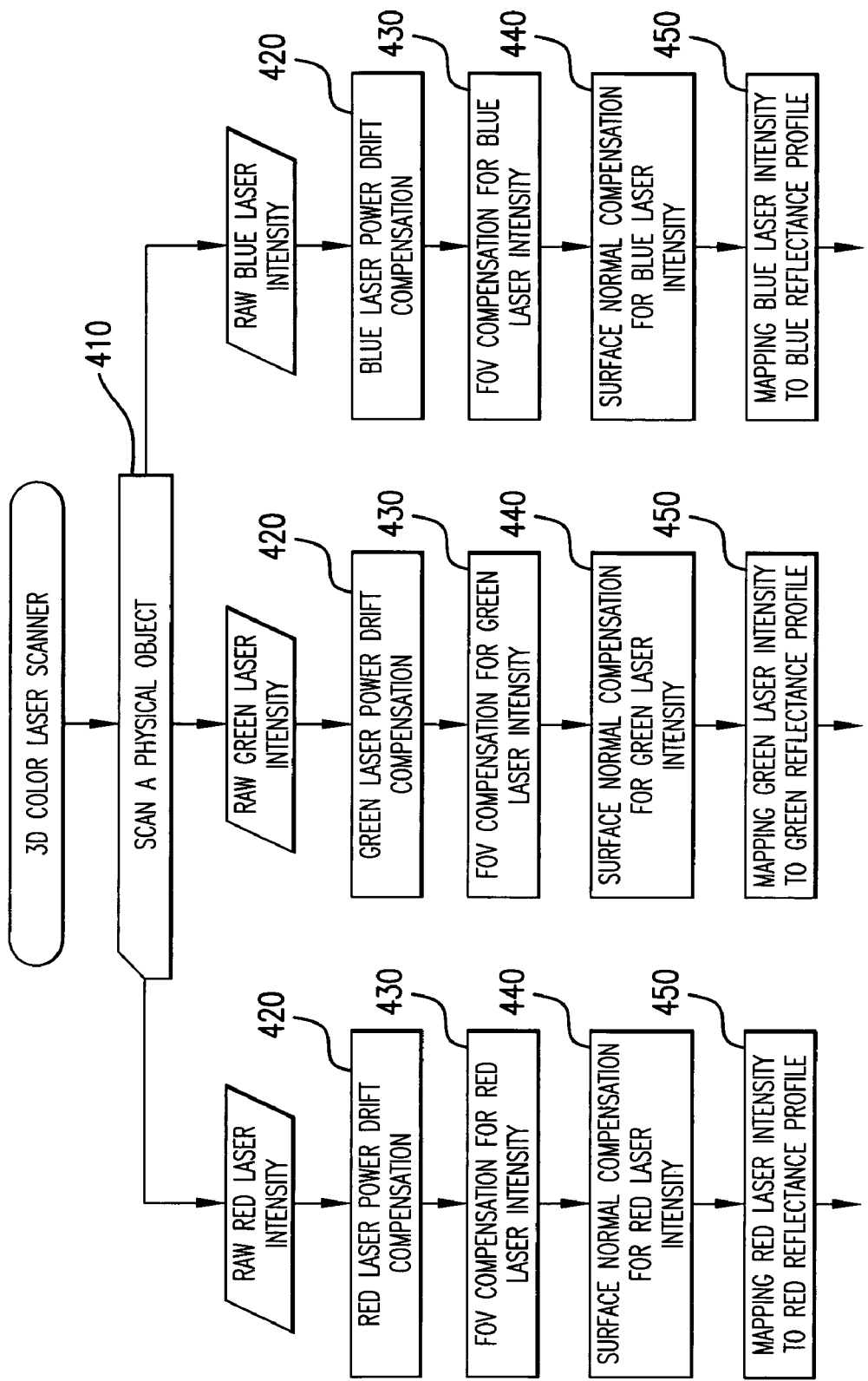
FIG. 4 illustrates a diagram of a method for calculating intrinsic color values from laser intensities according to one embodiment.
Figure 4:
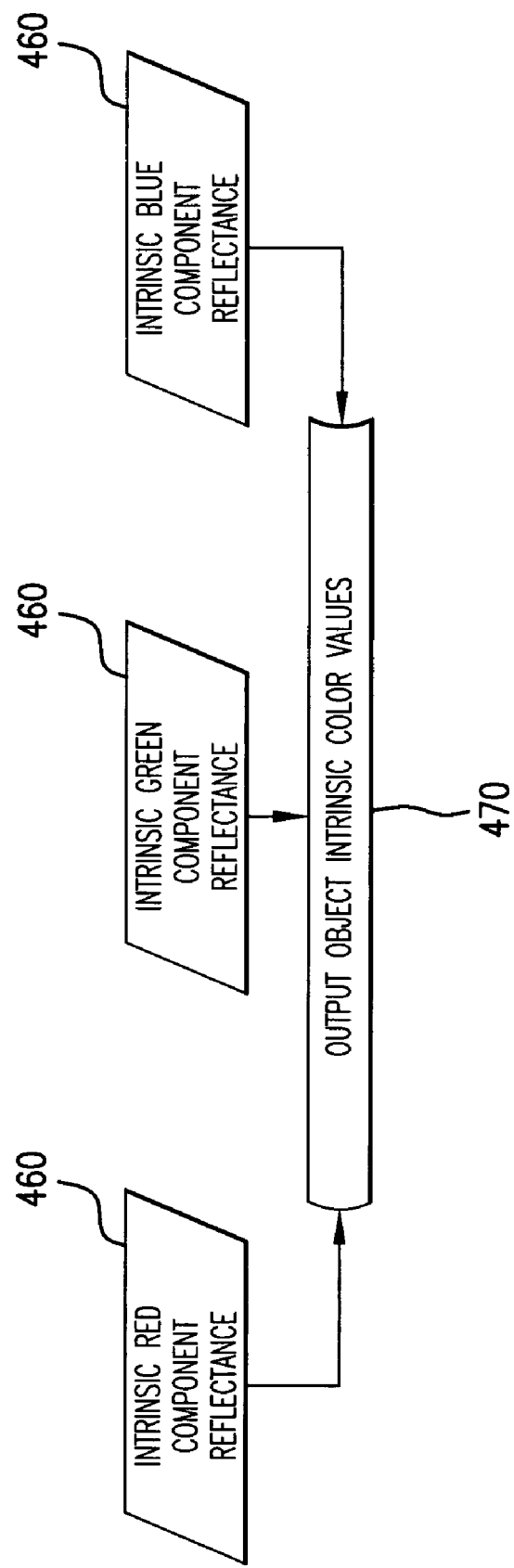

FIG. 4 illustrates a diagram of a method for calculating intrinsic color values from laser intensities according to one embodiment. After a FOV lookup table, laser intensity-color reflectance calibration profiles and laser intensity-surface normal calibration profiles are obtained, object intrinsic color values may be calculated from scanned data. Once the scanning system is calibrated, an object may be scanned in 410. In 420 and 430, the output laser intensity values from the scanned object from red, green and blue laser heads of the scanning system may be applied with laser power drift compensation and FOV compensation to compensate for influences from any fluctuations in laser power and scanning position changes in the FOV range, as discussed above.

In 440, the output laser intensity values for each of the laser colors may be applied with surface normal compensation. For an output laser intensity value scanned at a given scanning position, a corresponding reflection angle may be calculated. By mapping the calculated reflection angle to the laser intensity-surface normal calibration profile discussed in FIG. 3, a surface normal compensated laser intensity value may be obtained.

The following pseudo code demonstrates an example of an algorithm for surface normal compensation for a given measurement point:

```
function SurfaceNormalCompensation (
    a measurement point point[in, out],
    red laser surface normal compensation profile redSnctProfile[in],
    green laser surface normal compensation greenSnctProfile[in],
    blue laser surface normal compensation profile blueSnctProfile[in])
{
    // First transform the surface normal vector of the point to
    // the scanner coordinate system by using scanner's transformation
    // matrix
    CALL TransformSNVToSCS(point.normalVector[in],
                           scannerTransformMatrix[in],
                           normalVectorInSCS[out])
    // Then calculate the angle between the transformed surface normal
    // vector and detection lens vector
    CALL CalculateAngle(normalVectorInSCS[n],
                        Point.uvw[in],
                        detectionLensLocation[in],
                        angle[out])
    // Calculate surface normal compensated laser intensity from
    // the surface normal compensation profiles
    CALL CompensateSurfaceNormal(point.redIntensity[in, out],
                        angle[in],
                        redSurfaceNormalCompensatoinProfile[in])
    CALL CompensateSurfaceNormal(point.greenIntensity[in, out],
                        angle[in],
                        greenSurfaceNormalCompensatoinprofile[in])
    CALL CompensateSurfaceNormal(point.blueIntensity[in, out],
                        angle[in],
                        blueSurfaceNormalCompensatoinProfile[in])
}
```

In 450 and 460, laser intensity values obtained from the surface normal compensation discussed above may be mapped to the laser intensity-color reflectance calibration profile discussed in FIG. 2, to obtain an object's intrinsic color reflectance value for each laser head. In 470, the color value expressed in RGB (red-green-blue) color space may then be calculated from the red, green and blue intrinsic color reflectance values, and then output.

The following pseudo code demonstrates an example of an algorithm for calculating a correct color value for a given measurement point, after a laser power drift compensation, a FOV compensation, and a surface normal compensation have been performed, and color reflectance profiles for each laser head have been obtained:

```
function CalculateColorValueFromColorReflectanceProfiles (
    a measurement point point[in, out]
    red laser color reflectance profile redReflectanceProfile[in],
    green laser color reflectance profile greenReflectanceProfile[in],
    blue laser color reflectance profile blueReflectanceProfile[in])
{
    // Calculate grayscale values for the input point from color
    // reflectance profiels
    CALL CalculateRedColorValue(point.redIntensity,
                           redReflectanceProfile[in],
                           point.color.red[out])
    CALL CalculateGreenColorValue(point.greenIntensity,
                           greenReflectanceProfile[in],
                           point.color.green[out])
    CALL CalculateRedColorValue(point.blueIntensity,
                           blueReflectanceProfile[in],
                           point.color.blue[out])
}
```

Results

FIGS. 5-9 illustrate screen shots demonstrating various steps and possible outcomes of the present embodiments.

Figure 5:
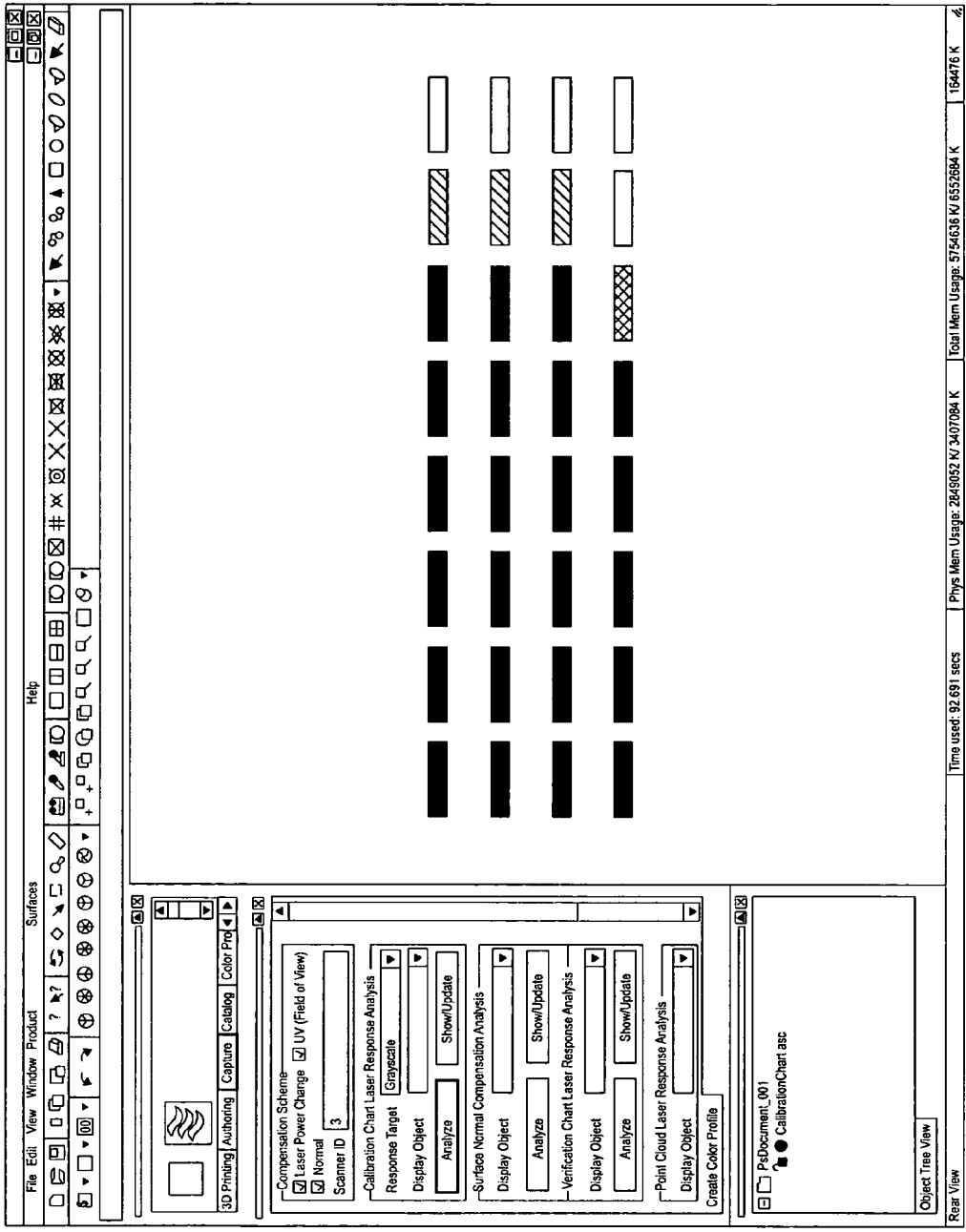
FIG. 5 illustrates a screen shot showing a raw three-dimensional point cloud scanned from a grayscale chart used as a color reflectance calibration target according to one embodiment.

FIG. 5 illustrates a screen shot showing a raw three-dimensional point cloud scanned from a grayscale chart used as a color reflectance calibration target according to one embodiment. In this embodiment, the color reflectance calibration target was a standard 23-steps, flat sheet, grayscale chart.

Figure 6:
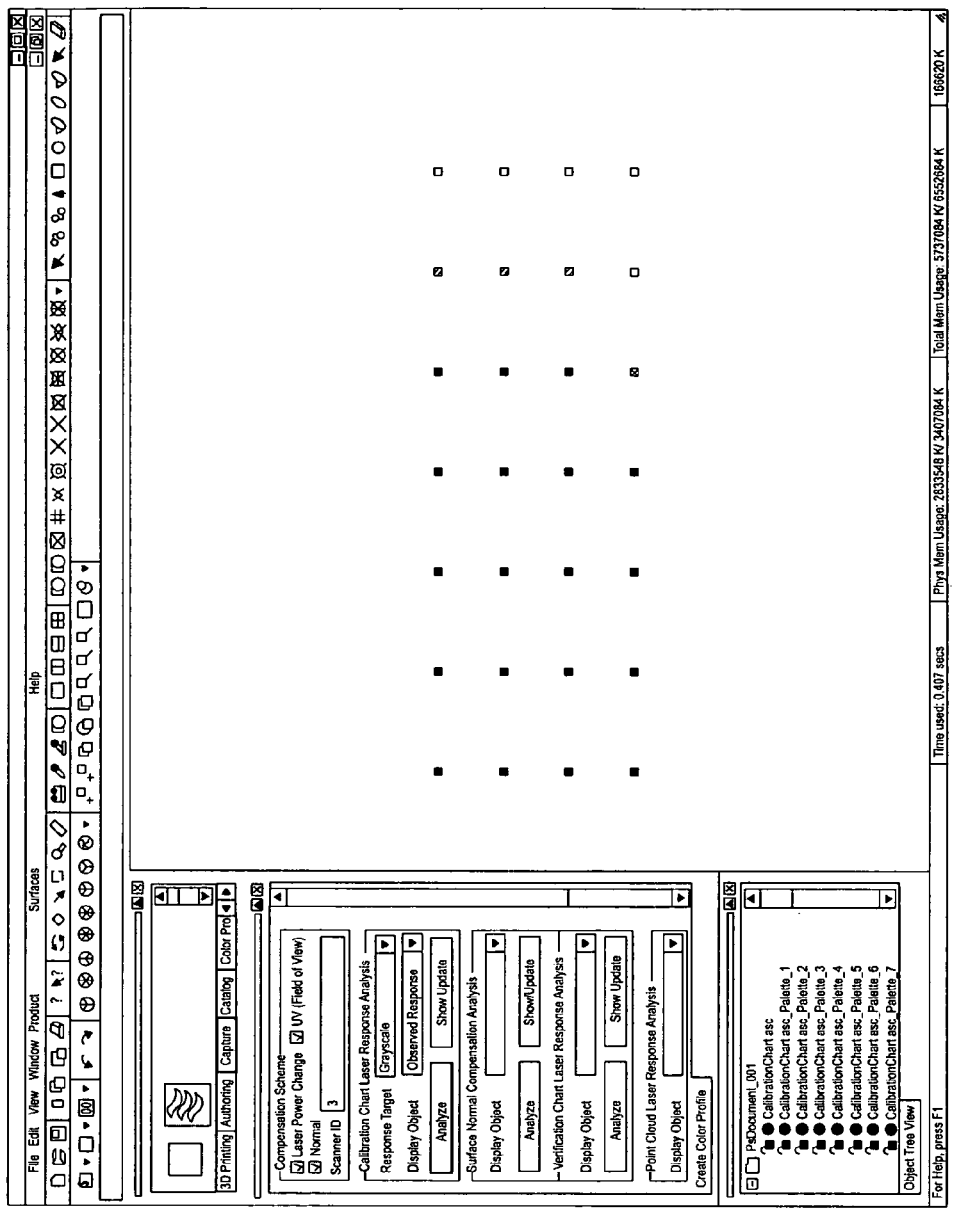
FIG. 6 illustrates a screen shot showing the three-dimensional point cloud of FIG. 5 sub-sampled from each grayscale stripe of the color reflectance calibration target according to one embodiment.

FIG. 6 illustrates a screen shot showing the three-dimensional point cloud of FIG. 5 sub-sampled from each grayscale stripe of the color reflectance calibration target according to one embodiment. The purpose of this sub-sampling is to obtain the highest possible quality from the color calibration target before calculating calibration profiles. Each small square appearing in the screen shot is sub-sampled from the center of its corresponding grayscale stripe.

Figure 7:
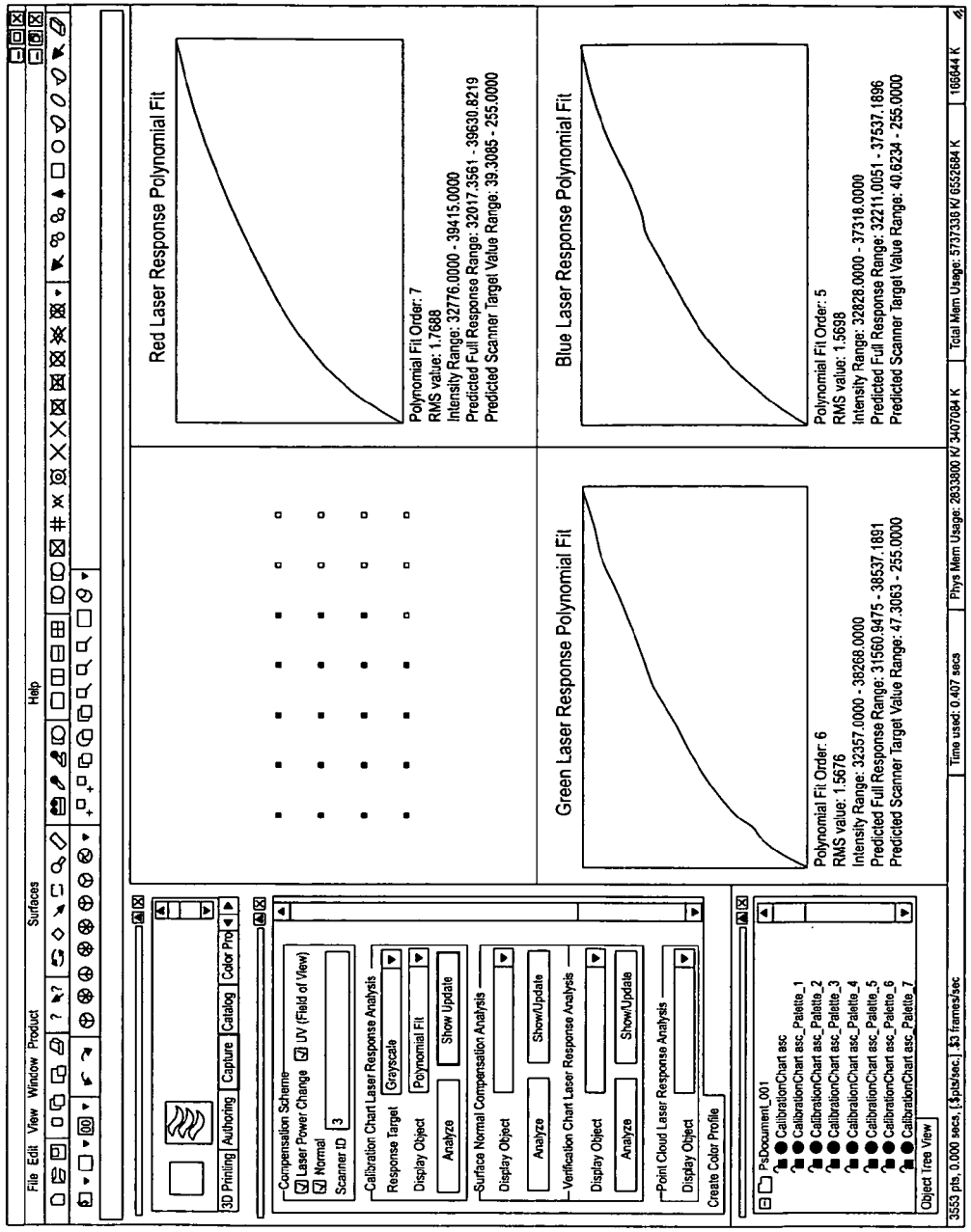
FIG. 7 illustrates a screen shot showing the color reflectance calibration profiles obtained by applying an optimal polynomial fitting algorithm to the sub-sampled data of FIG. 6 according to one embodiment.

FIG. 7 illustrates a screen shot showing the color reflectance calibration profiles obtained by applying an optimal polynomial fitting algorithm to the sub-sampled data of FIG. 6 according to one embodiment. The profiles of the three laser colors are used to calibrate laser intensities based on color reflectance properties. As can be seen in the figure, the relationship between laser intensities and color reflectance is non-linear.

Figure 8:
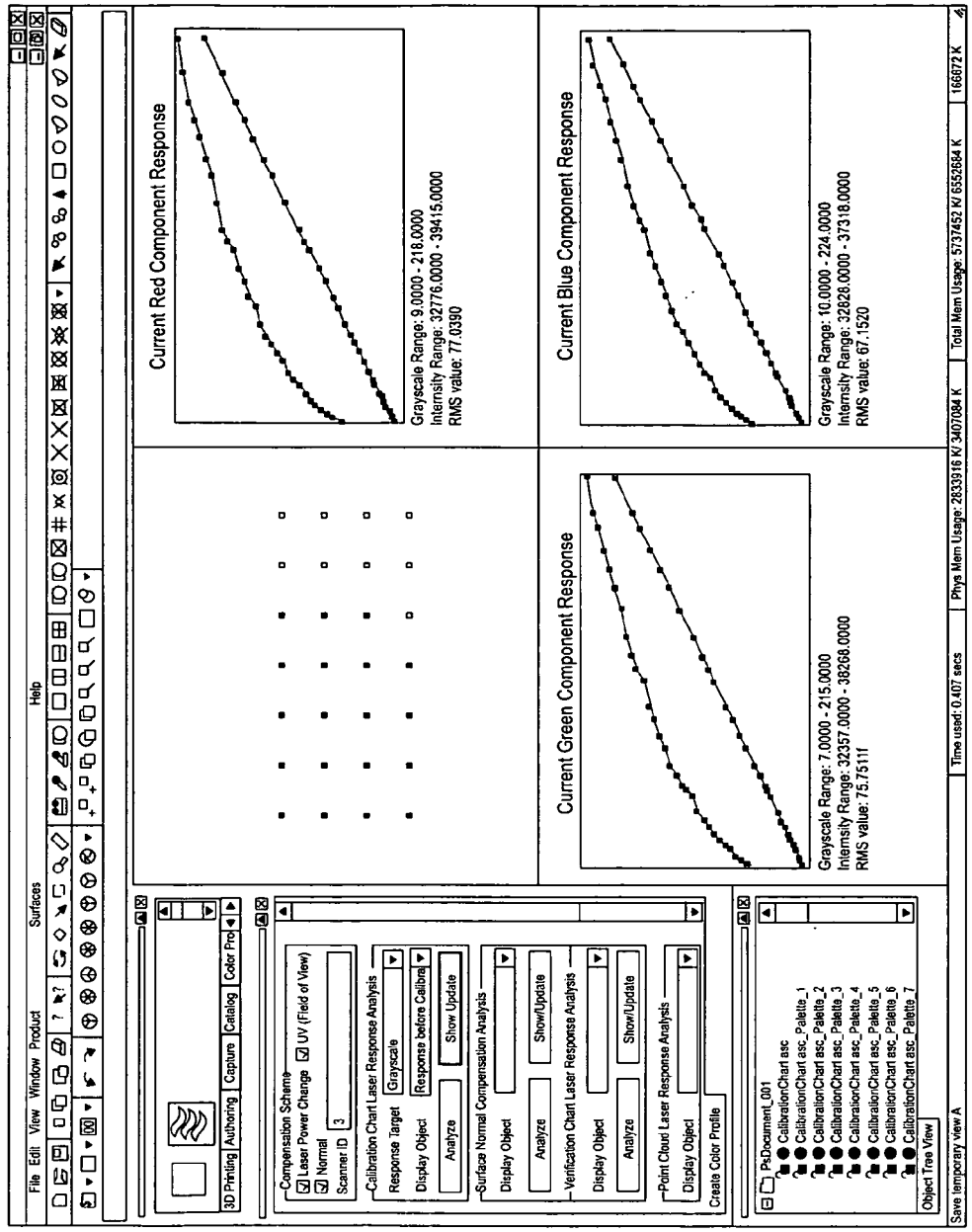
FIG. 8 illustrates a screen shot showing color reflectance response from a color reflectance calibration target using conventional calibration methods.

FIG. 8 illustrates a screen shot showing color reflectance response from a color reflectance calibration target using conventional calibration methods. The top and bottom curves for each window in the screen shot represent theoretic and observed color reflectance responses, respectively. Each of the three windows relate to a specific laser color. As can be seen, the root-mean-squared (RMS) values in a 0-255 range are from 67 to 77. This implies an error of 26 to 30% by using conventional calibration procedures.

Figure 9:
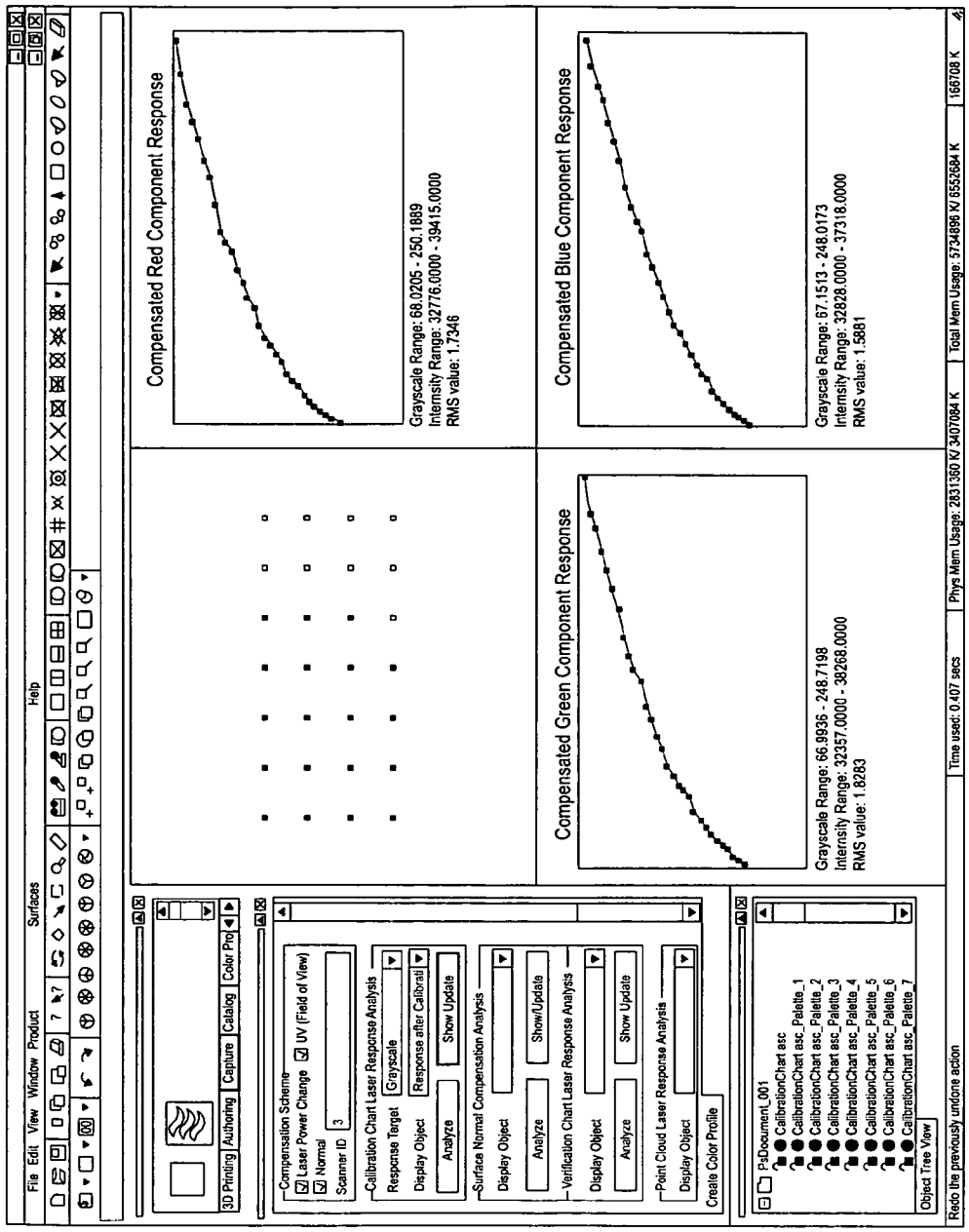
FIG. 9 illustrates a screen shot showing color reflectance response from a color reflectance calibration target using the present embodiments.

FIG. 9 illustrates a screen shot showing color reflectance response from a color reflectance calibration target using the present embodiments. The top and bottom curves for each window in the screen shot represent theoretic and observed color reflectance responses, respectively. Each of the three windows relate to a specific laser component color. As can be seen, the RMS values have been reduced significantly from the values shown in FIG. 8. Specifically, the RMS values are less than 2, indicating an error of less than 0.8%, by using the color calibration procedures of the present embodiments.

Tables 1 and 2 summarize statistics data from color reflectance calibration using conventional calibration methods compared to the present embodiments, as illustrated in FIGS. 8 and 9.

Figure 10:
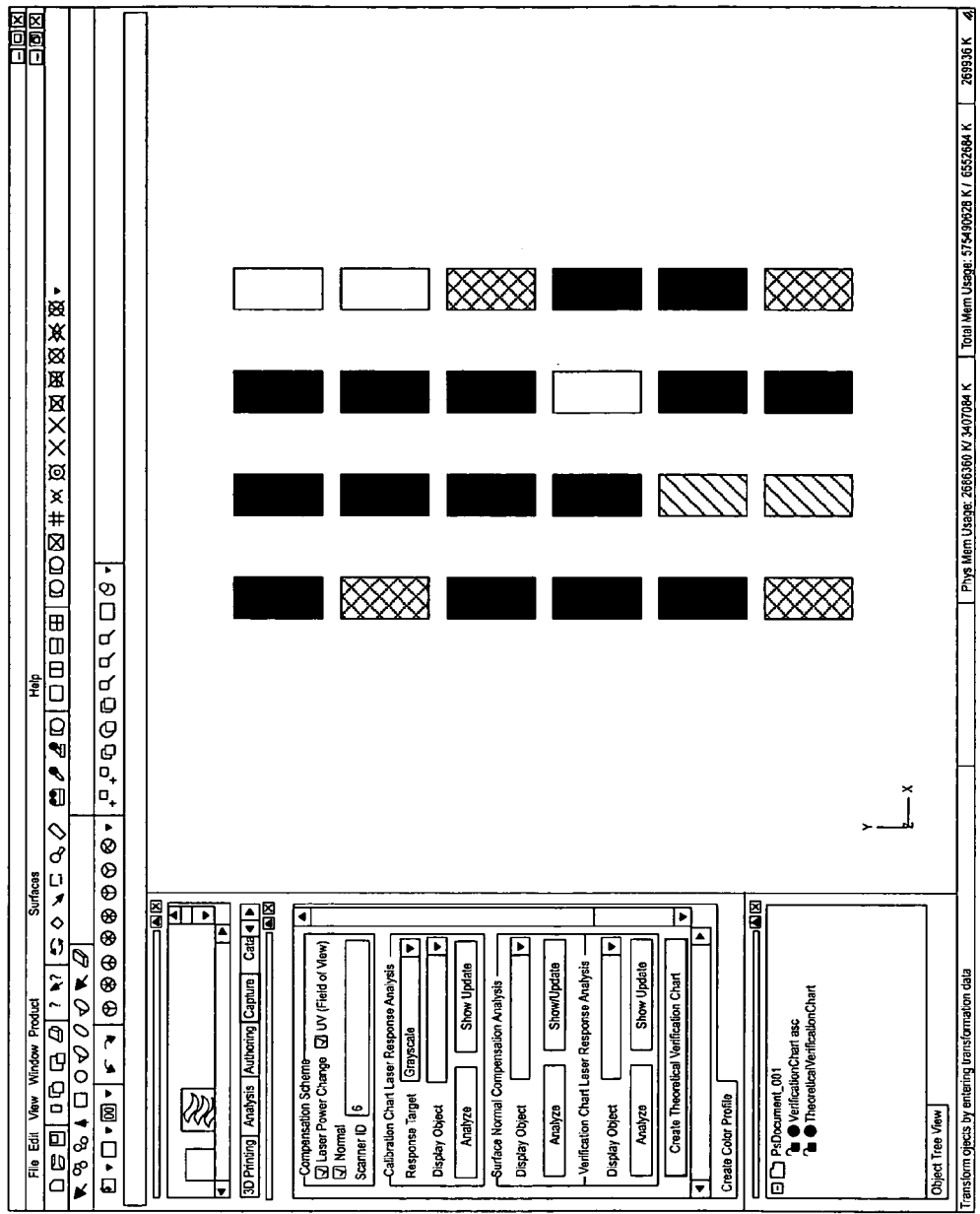
FIG. 10 illustrates a screen shot showing a theoretical color chart modeled from the geometry of a physical color chart in an independent color verification procedure.
Figure 11:
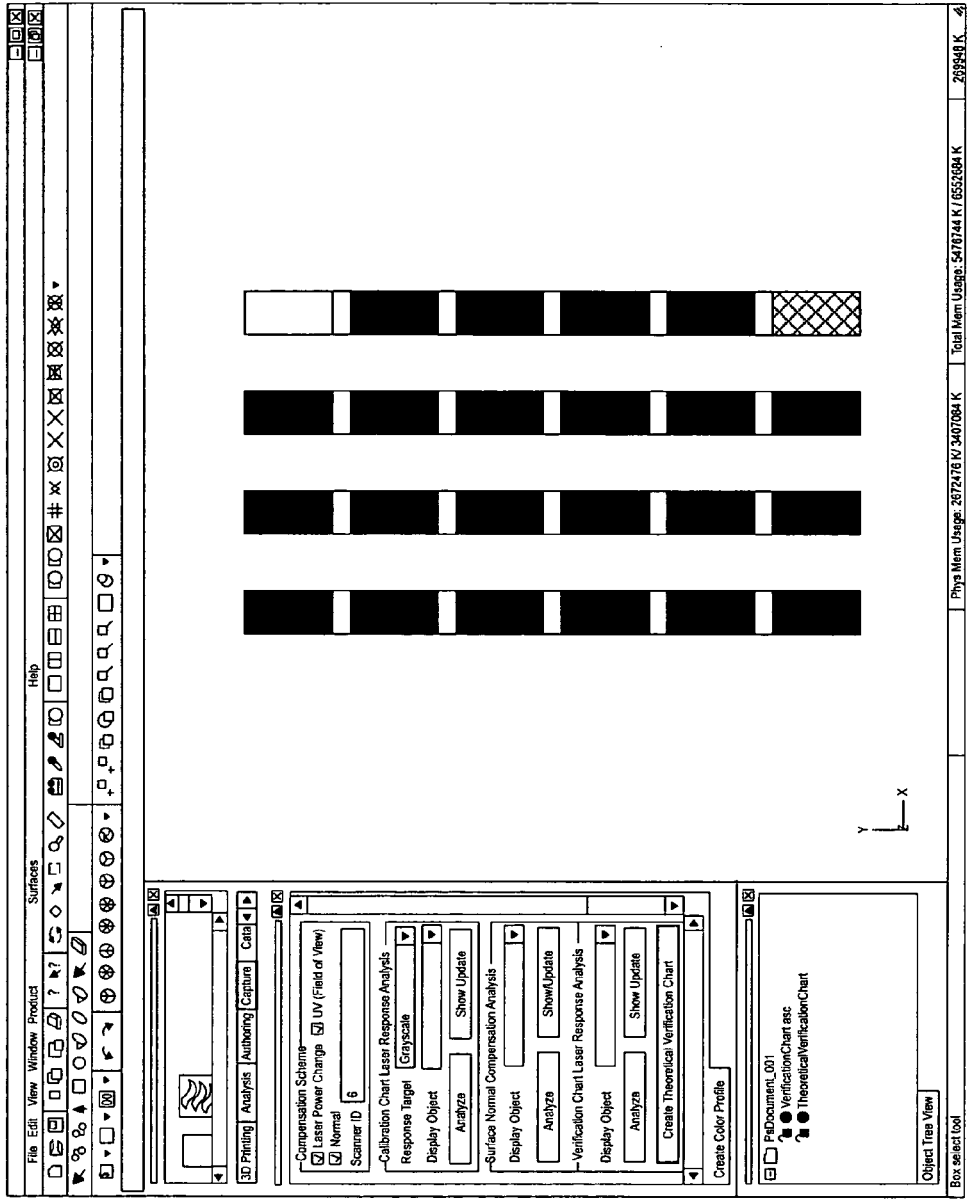
FIG. 11 illustrates a screen shot showing the scanned color chart using conventional calibration methods.
Figure 12:
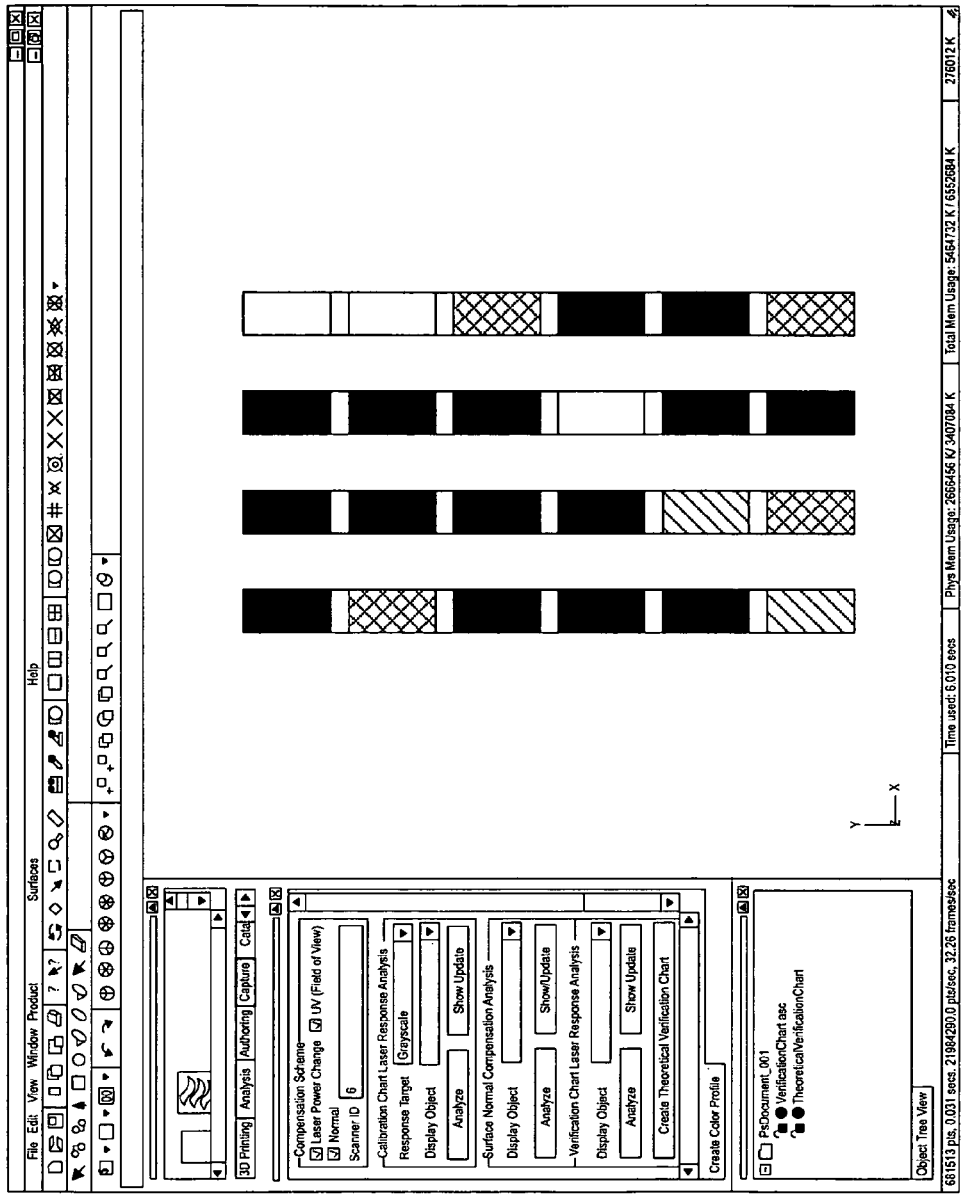
FIG. 12 illustrates a screen shot showing the scanned color chart after applying the calibration methods of the present embodiments.

In order to verify the effectiveness of the color calibration methods of the present embodiments, a color chart with 24 colored squares from GretagMacbeth AG™, a leading company for providing color technology services, was used as an independent verification target. FIGS. 10-12 show the outcome from this verification process. CG (computer graphics) lights, or a virtual lights setup in a 3D rendering environment, were turned off and all rendering was done on the same computer to ensure an accurate analysis.

FIG. 10 illustrates a screen shot showing a theoretical color chart modeled from the geometry of the physical color chart. FIG. 11 illustrates a screen shot showing the scanned color chart using conventional calibration methods. As can be seen, the color values are significantly different from the theoretical values shown in FIG. 10. The overall RMS is as high as 65.7, which implies an error of 25.7%.

TABLE 1

Color Reflectance Calibration Statistics Data

| | Theoretical Values | | | Values Using Conventional Methods | | | | | | Values Using Present Embodiments | | | | | |
| --- | --- | --- | --- | --- | --- | --- | --- | --- | --- | --- | --- | --- | --- | --- | --- |
| Steps | Red | Green | Blue | Red | Green | Blue | ΔR | ΔG | ΔB | Red | Green | Blue | ΔR | ΔG | ΔB |
| 0 | 65 | 65 | 65 | 9 | 7 | 10 | −56 | −58 | −55 | 68 | 66 | 67 | 3 | 1 | 2 |
| 1 | 70 | 70 | 70 | 9 | 8 | 11 | −61 | −62 | −59 | 70 | 69 | 71 | 0 | −1 | 1 |
| 2 | 75 | 75 | 75 | 11 | 10 | 13 | −64 | −65 | −62 | 74 | 73 | 75 | −1 | −2 | 0 |
| 3 | 81 | 81 | 81 | 13 | 11 | 16 | −68 | −70 | −65 | 79 | 78 | 79 | −2 | −3 | −2 |
| 4 | 87 | 87 | 87 | 15 | 15 | 19 | −72 | −72 | −68 | 85 | 87 | 85 | −2 | 0 | −2 |
| 5 | 93 | 93 | 93 | 18 | 17 | 22 | −75 | −76 | −71 | 91 | 92 | 90 | −2 | −1 | −3 |
| 6 | 99 | 99 | 99 | 20 | 21 | 24 | −79 | −78 | −75 | 95 | 96 | 95 | −4 | −3 | −4 |
| 7 | 105 | 105 | 105 | 24 | 24 | 28 | −81 | −81 | −77 | 103 | 103 | 101 | −2 | −2 | −4 |
| 8 | 111 | 111 | 111 | 29 | 27 | 36 | −82 | −84 | −75 | 112 | 110 | 112 | 1 | −1 | 1 |
| 9 | 117 | 117 | 117 | 31 | 30 | 39 | −86 | −87 | −78 | 116 | 114 | 116 | −1 | −3 | −1 |
| 10 | 123 | 123 | 123 | 35 | 35 | 42 | −88 | −88 | −80 | 122 | 122 | 122 | −1 | −1 | −1 |
| 11 | 129 | 129 | 129 | 41 | 43 | 49 | −88 | −86 | −80 | 131 | 133 | 130 | 2 | 4 | 1 |
| 12 | 135 | 135 | 135 | 46 | 47 | 55 | −89 | −88 | −80 | 136 | 137 | 136 | 1 | 2 | 1 |
| 13 | 141 | 141 | 141 | 51 | 49 | 61 | −90 | −92 | −80 | 142 | 139 | 142 | 1 | −2 | 1 |
| 14 | 147 | 147 | 147 | 55 | 54 | 66 | −92 | −93 | −81 | 147 | 145 | 147 | 0 | −2 | 0 |
| 15 | 154 | 154 | 154 | 61 | 60 | 72 | −93 | −94 | −82 | 153 | 151 | 152 | −1 | −3 | −2 |
| 16 | 160 | 160 | 160 | 71 | 69 | 80 | −89 | −91 | −80 | 161 | 159 | 160 | 1 | −1 | 0 |
| 17 | 166 | 166 | 166 | 76 | 76 | 87 | −90 | −90 | −79 | 166 | 165 | 166 | 0 | −1 | 0 |
| 18 | 172 | 172 | 172 | 85 | 85 | 96 | −87 | −87 | −76 | 173 | 171 | 172 | 1 | −1 | 0 |
| 19 | 178 | 178 | 178 | 91 | 92 | 103 | −87 | −86 | −75 | 178 | 176 | 177 | 0 | −2 | −1 |
| 20 | 185 | 185 | 185 | 102 | 106 | 119 | −83 | −79 | −66 | 185 | 186 | 186 | 0 | 1 | 1 |
| 21 | 191 | 191 | 191 | 107 | 112 | 123 | −84 | −79 | −68 | 189 | 189 | 189 | −2 | −2 | −2 |
| 22 | 197 | 197 | 197 | 112 | 118 | 131 | −85 | −79 | −66 | 193 | 194 | 194 | −4 | −3 | −3 |
| 23 | 203 | 203 | 203 | 128 | 129 | 143 | −75 | −74 | −60 | 203 | 200 | 201 | 0 | −3 | −2 |
| 24 | 210 | 210 | 210 | 143 | 144 | 157 | −67 | −66 | −53 | 212 | 209 | 210 | 2 | −1 | 0 |
| 25 | 216 | 216 | 216 | 152 | 156 | 168 | −64 | −60 | −48 | 218 | 216 | 216 | 2 | 0 | 0 |
| 26 | 222 | 222 | 222 | 164 | 165 | 178 | −58 | −57 | −44 | 224 | 222 | 222 | 2 | 0 | 0 |
| 27 | 229 | 229 | 229 | 172 | 176 | 191 | −57 | −53 | −38 | 229 | 228 | 229 | 0 | −1 | 0 |
| 28 | 235 | 235 | 235 | 184 | 188 | 198 | −51 | −47 | −37 | 234 | 234 | 234 | −1 | −1 | −1 |
| 29 | 242 | 242 | 242 | 200 | 196 | 210 | −42 | −46 | −32 | 240 | 238 | 240 | −2 | −4 | −2 |
| 30 | 248 | 248 | 248 | 218 | 215 | 224 | −30 | −33 | −24 | 250 | 248 | 248 | 2 | 0 | 0 |

TABLE 2

RMS Values from Color Reflectance Calibration Procedure

| RMS Values Using Conventional Methods | | | RMS Values Using Present Embodiments | | |
| --- | --- | --- | --- | --- | --- |
| Red | Green | Blue | Red | Green | Blue |
| 77.038951 | 75.751078 | 67.151970 | 1.734555 | 1.828290 | 1.588146 |

FIG. 12 illustrates a screen shot showing the scanned color chart after applying the calibration methods of the present embodiments. As can be seen, the calibrated color values are significantly improved over those of FIG. 11 toward their theoretical values of FIG. 10. In fact, the overall RMS is reduced to 15.6, which implies an error of 6%.

Tables 3 and 4 summarize the statistics data from the independent color verification procedure using conventional calibration methods compared to the present embodiments, as illustrated in FIGS. 11 and 12.

TABLE 3

Color Verification Statistics Data

| | Theoretical Values | | | Values Using Conventional Methods | | | | | | Values Using Present Embodiments | | | | | |
|---|---|---|---|---|---|---|---|---|---|---|---|---|---|---|---|
| Steps | Red | Green | Blue | Red | Green | Blue | ΔR | ΔG | ΔB | Red | Green | Blue | ΔR | ΔG | ΔB |
| 0 | 129 | 96 | 82 | 45 | 23 | 15 | −84 | −73 | −67 | 123 | 83 | 73 | −6 | −13 | −9 |
| 1 | 205 | 163 | 144 | 157 | 84 | 67 | −48 | −79 | −77 | 203 | 157 | 143 | −2 | −6 | −1 |
| 2 | 112 | 135 | 169 | 39 | 58 | 90 | −73 | −77 | −79 | 115 | 134 | 161 | 3 | −1 | −8 |
| 3 | 103 | 121 | 81 | 30 | 53 | 19 | −73 | −68 | −62 | 101 | 127 | 80 | −2 | 6 | −1 |
| 4 | 146 | 142 | 188 | 74 | 62 | 109 | −72 | −80 | −79 | 152 | 138 | 175 | 6 | −4 | −13 |
| 5 | 120 | 198 | 182 | 51 | 148 | 123 | −69 | −50 | −59 | 130 | 195 | 183 | 10 | −3 | 1 |
| 6 | 223 | 141 | 57 | 166 | 49 | 16 | −57 | −92 | −41 | 206 | 123 | 75 | −17 | −18 | 18 |
| 7 | 91 | 106 | 178 | 23 | 33 | 95 | −68 | −73 | −83 | 89 | 100 | 166 | −2 | −6 | −12 |
| 8 | 203 | 106 | 114 | 168 | 28 | 33 | −35 | −78 | −81 | 207 | 93 | 104 | 4 | −13 | −10 |
| 9 | 107 | 74 | 122 | 36 | 14 | 23 | −71 | −60 | −99 | 110 | 64 | 87 | 3 | −10 | −35 |
| 10 | 173 | 197 | 78 | 88 | 145 | 30 | −85 | −52 | −48 | 161 | 196 | 100 | −12 | −1 | 22 |
| 11 | 233 | 175 | 61 | 163 | 85 | 19 | −70 | −90 | −42 | 205 | 158 | 81 | −28 | −17 | 20 |
| 12 | 65 | 75 | 163 | 11 | 14 | 79 | −54 | −61 | −84 | 61 | 64 | 154 | −4 | −11 | −9 |
| 13 | 88 | 160 | 87 | 22 | 85 | 28 | −66 | −75 | −59 | 87 | 158 | 96 | −1 | −2 | 9 |
| 14 | 186 | 70 | 73 | 199 | 16 | 13 | 13 | −54 | −60 | 220 | 70 | 68 | 34 | 0 | −5 |
| 15 | 240 | 208 | 47 | 217 | 155 | 25 | −23 | −53 | −22 | 227 | 201 | 92 | −13 | −7 | 45 |
| 16 | 197 | 103 | 162 | 196 | 29 | 63 | −1 | −74 | −99 | 219 | 95 | 140 | 22 | −8 | −22 |
| 17 | 0 | 146 | 178 | 25 | 77 | 132 | 25 | −69 | −46 | 91 | 152 | 187 | 91 | 6 | 9 |
| 18 | 249 | 248 | 248 | 255 | 244 | 246 | 6 | −4 | −2 | 243 | 242 | 243 | −6 | −6 | −5 |
| 19 | 211 | 209 | 210 | 166 | 157 | 162 | −45 | −52 | −48 | 206 | 201 | 203 | −5 | −8 | −7 |
| 20 | 173 | 172 | 173 | 98 | 95 | 99 | −75 | −77 | −74 | 167 | 166 | 168 | −6 | −6 | −5 |
| 21 | 136 | 135 | 135 | 52 | 53 | 55 | −84 | −82 | −80 | 130 | 129 | 132 | −6 | −6 | −3 |
| 22 | 99 | 99 | 99 | 22 | 25 | 24 | −77 | −74 | −75 | 87 | 88 | 90 | −12 | −11 | −9 |
| 23 | 65 | 65 | 65 | 7 | 9 | 7 | −58 | −56 | −58 | 53 | 51 | 54 | −12 | −14 | −11 |

TABLE 4

RMS Values from Color Verification Procedure

| RMS Values Using Conventional Methods | | | RMS Values Using Present Embodiments | | |
|---|---|---|---|---|---|
| Red | Green | Blue | Red | Green | Blue |
| 60.847487 | 69.100470 | 67.372101 | 22.409051 | 8.758013 | 15.779256 |

The ΔR value of 91 from step number 17 (color name: cyan) was mainly caused by the theoretical value of zero for the red component, since the laser scanner cannot pick up an accurate red laser intensity due to a strong influence of ambient light on zero-valued RGB color component.

FIGS. 13-16 demonstrate the outcome of the surface normal calibration process described above.

Figure 13:
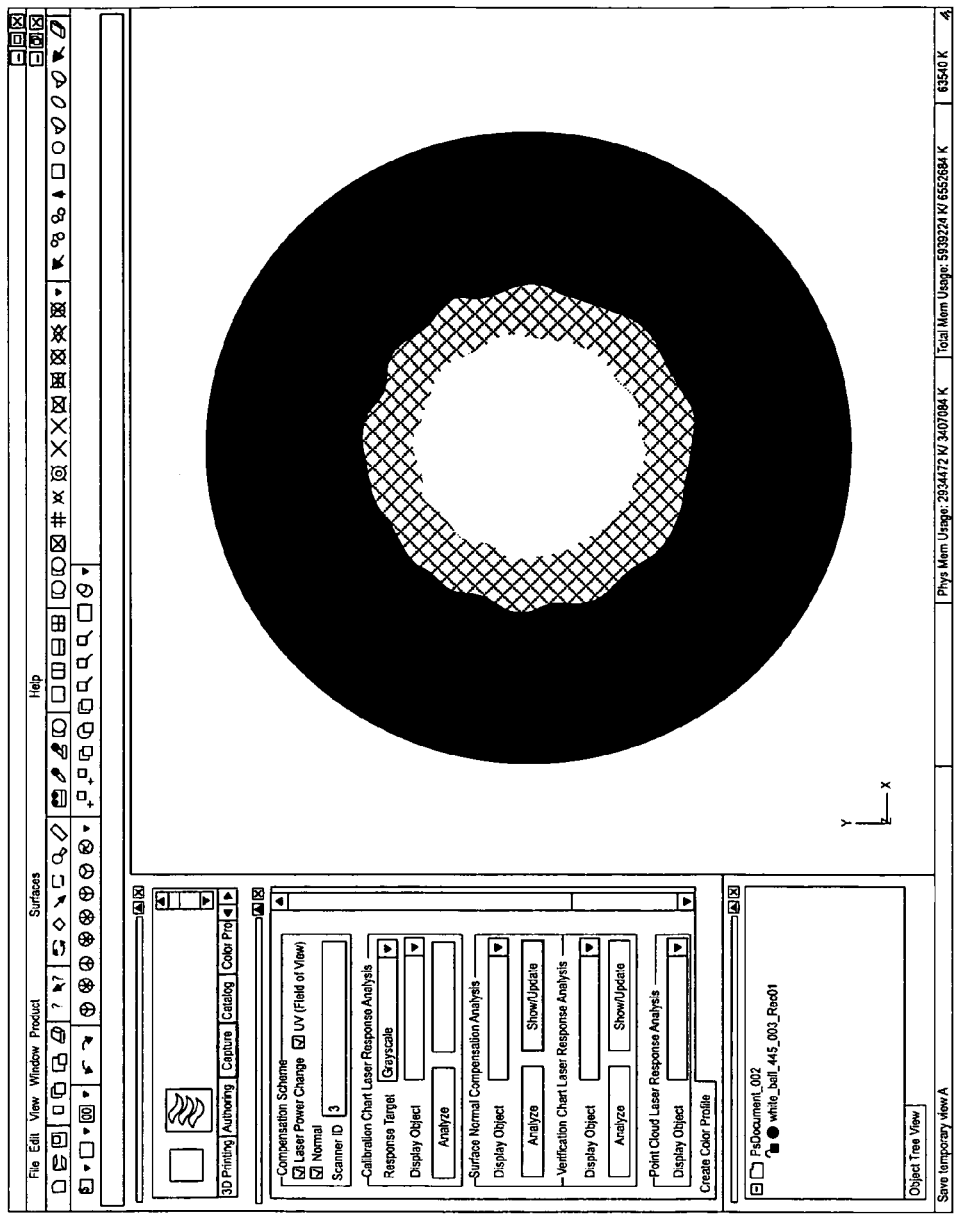
FIG. 13 illustrates a screen shot showing a three-dimensional point cloud scanned from a half surface of a surface normal calibration target according to one embodiment.

FIG. 13 illustrates a screen shot showing a three-dimensional point cloud scanned from a half surface of a surface normal calibration target according to one embodiment.

Figure 14:
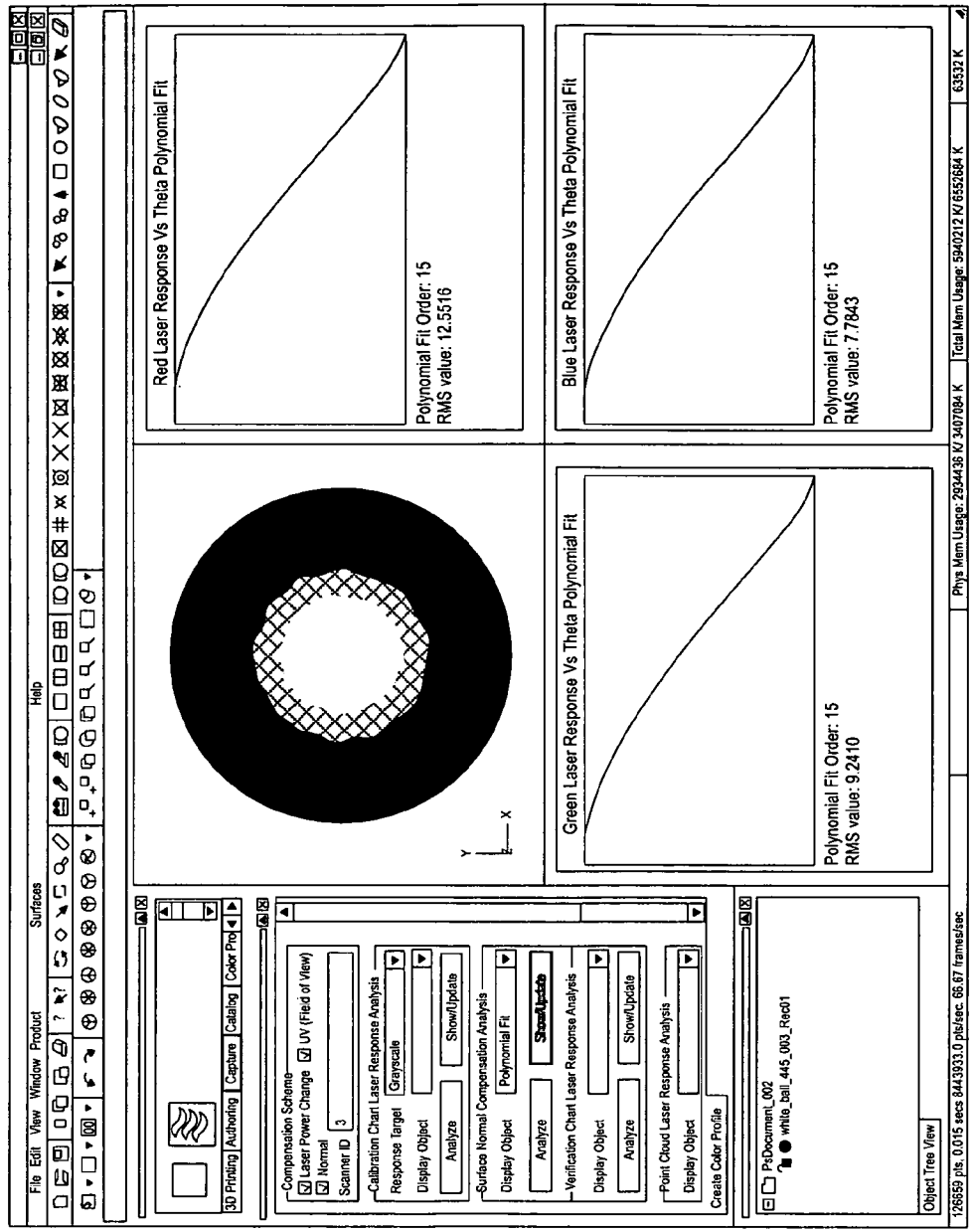
FIG. 14 illustrates a screen shot showing the surface normal calibration profiles obtained by applying an optimal fitting algorithm to sub-sampled data from the surface normal calibration target of FIG. 13.

FIG. 14 illustrates a screen shot showing the surface normal calibration profiles obtained by applying an optimal fitting algorithm to sub-sampled data from the surface normal calibration target of FIG. 13. The three profiles shown may be used to calibrate the effects of surface normal directions on laser intensity values.

In order to analyze the effectiveness of the surface normal calibration, laser intensity histograms are obtained from the laser intensity data before and after applying calibration of the present embodiments.

Figure 15:
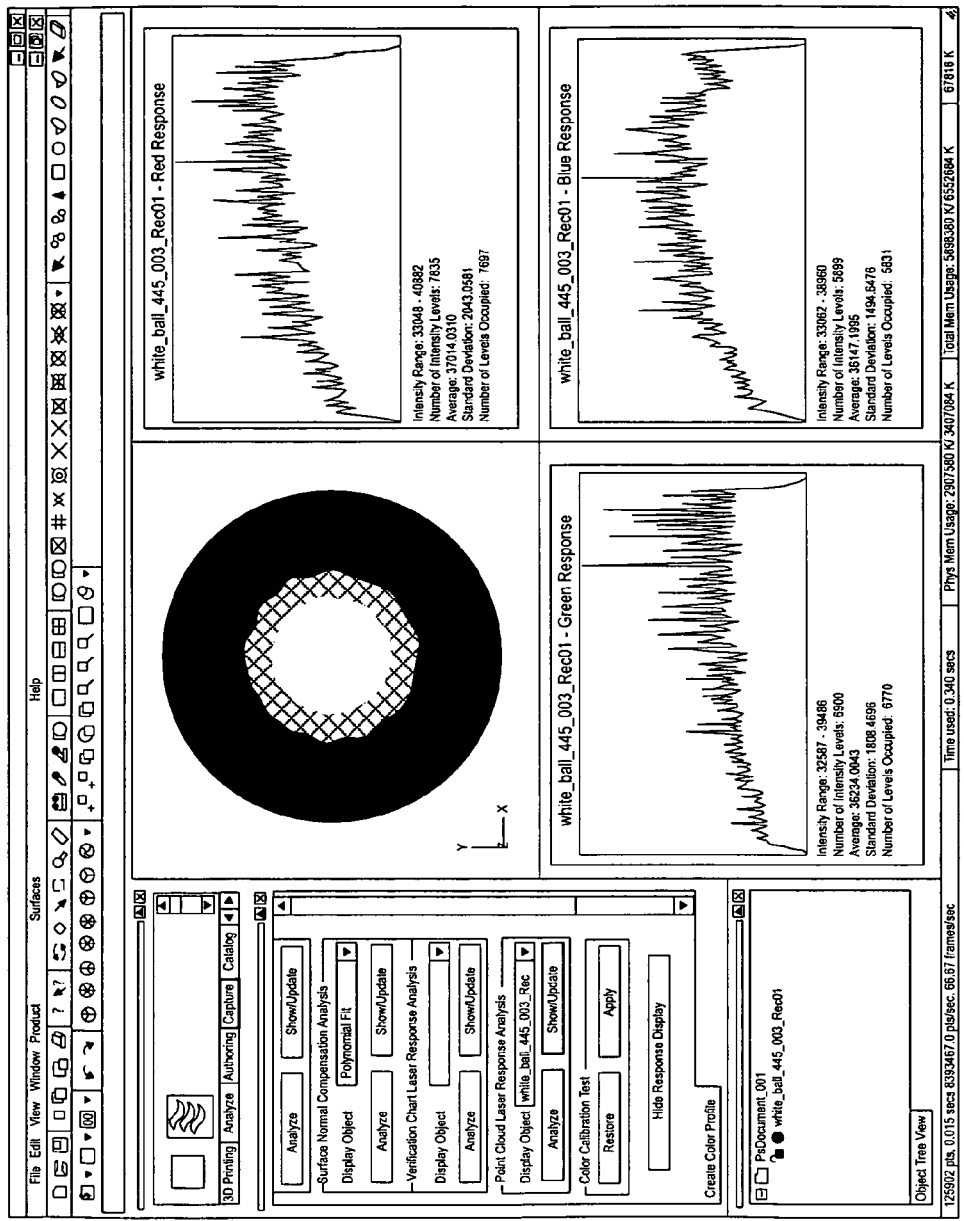
FIG. 15 illustrates a screen shot showing a laser intensity histogram from the surface normal calibration target using conventional methods.

FIG. 15 illustrates a screen shot showing a laser intensity histogram from the surface normal calibration target using conventional methods. As can be seen, the surface normal has not been uniformly compensated, causing the laser intensities to be distributed over wide ranges. This becomes more significant as the angle between the surface normal and the scanner detection direction increases.

Figure 16:
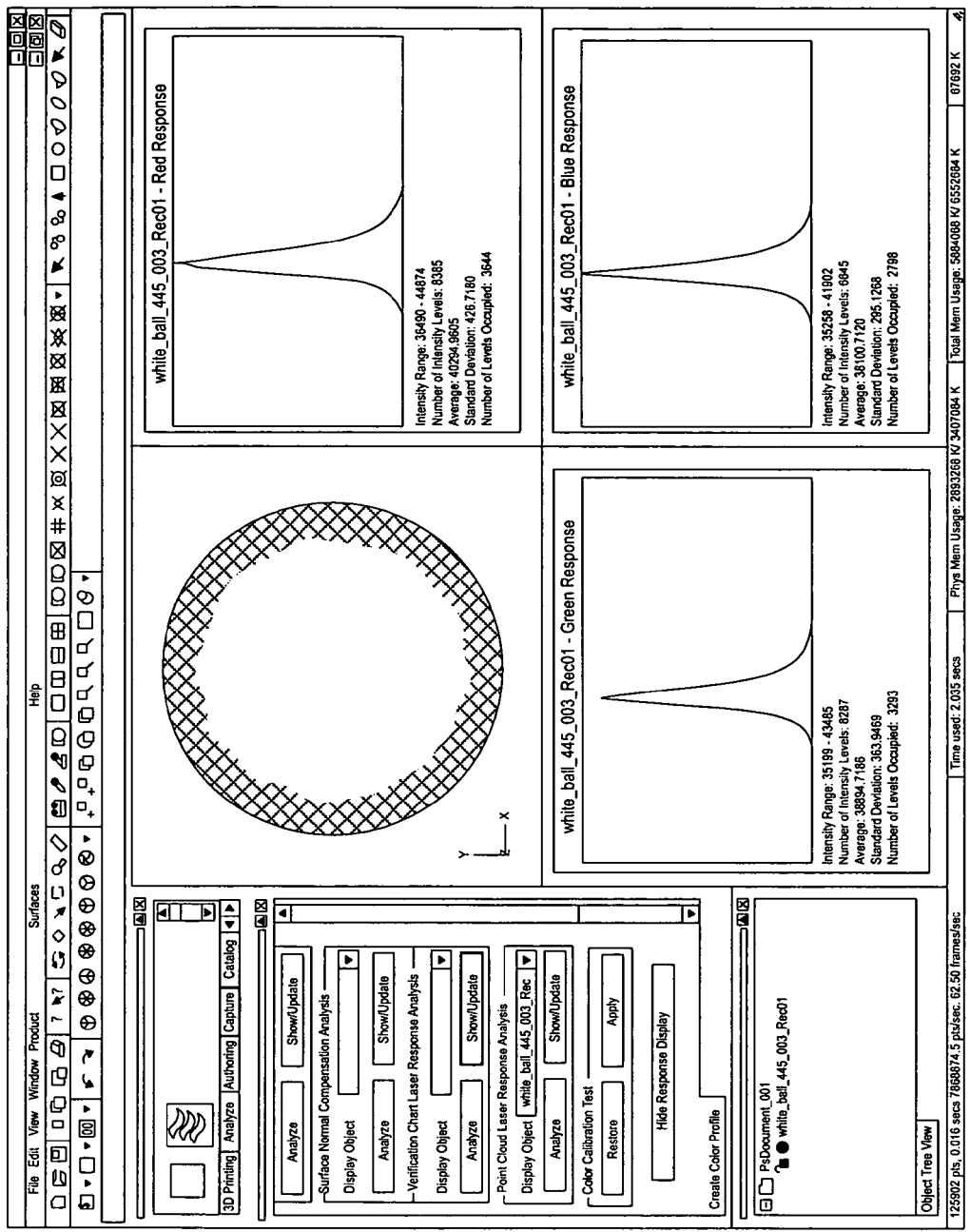
FIG. 16 illustrates a screen shot showing a laser intensity histogram from the surface normal calibration target using calibration of the present embodiments.

FIG. 16 illustrates a screen shot showing a laser intensity histogram from the surface normal calibration target using calibration of the present embodiments. As can be seen, the surface normal has been uniformly compensated. Therefore, the compensated laser intensities are now distributed over narrow ranges and more closely resemble a Gaussian distribution.

Figure 17:
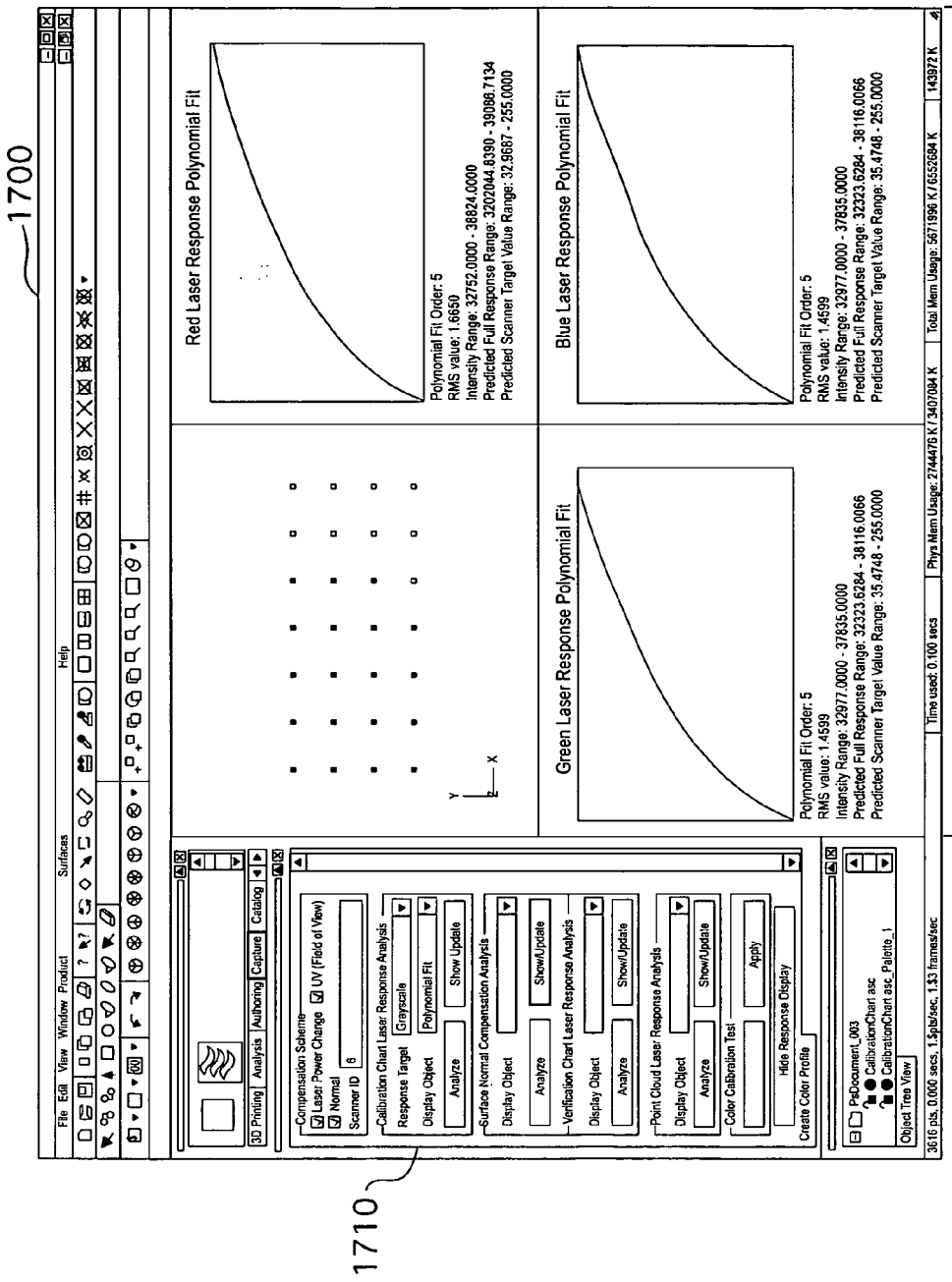
FIG. 17 illustrates a screen shot according to one embodiment of a graphical user interface (GUI) for use with the present embodiments.

FIG. 17 illustrates a screen shot according to one embodiment of a graphical user interface (GUI) for use with the present embodiments. The GUI 1700 allows a user to (a) perform various laser intensity calibration procedures, including color reflectance calibration, surface normal calibration, and independent verification procedures, (b) perform detailed laser intensity histogram analysis before and after the calibration procedures, (c) test the effectiveness of the present embodiments on any point cloud dataset that contains laser intensity information, and (d) individually perform a particular calibration or compensation (such as laser power compensation and FOV compensation) in order to isolate influences from other factors. Section 1710 may allow a user to execute and customize one or more of the calibration procedures of the present embodiments. Section 1720 may include one or more sub-sections displaying the results of calibration procedures or related analysis.

Figure 18:
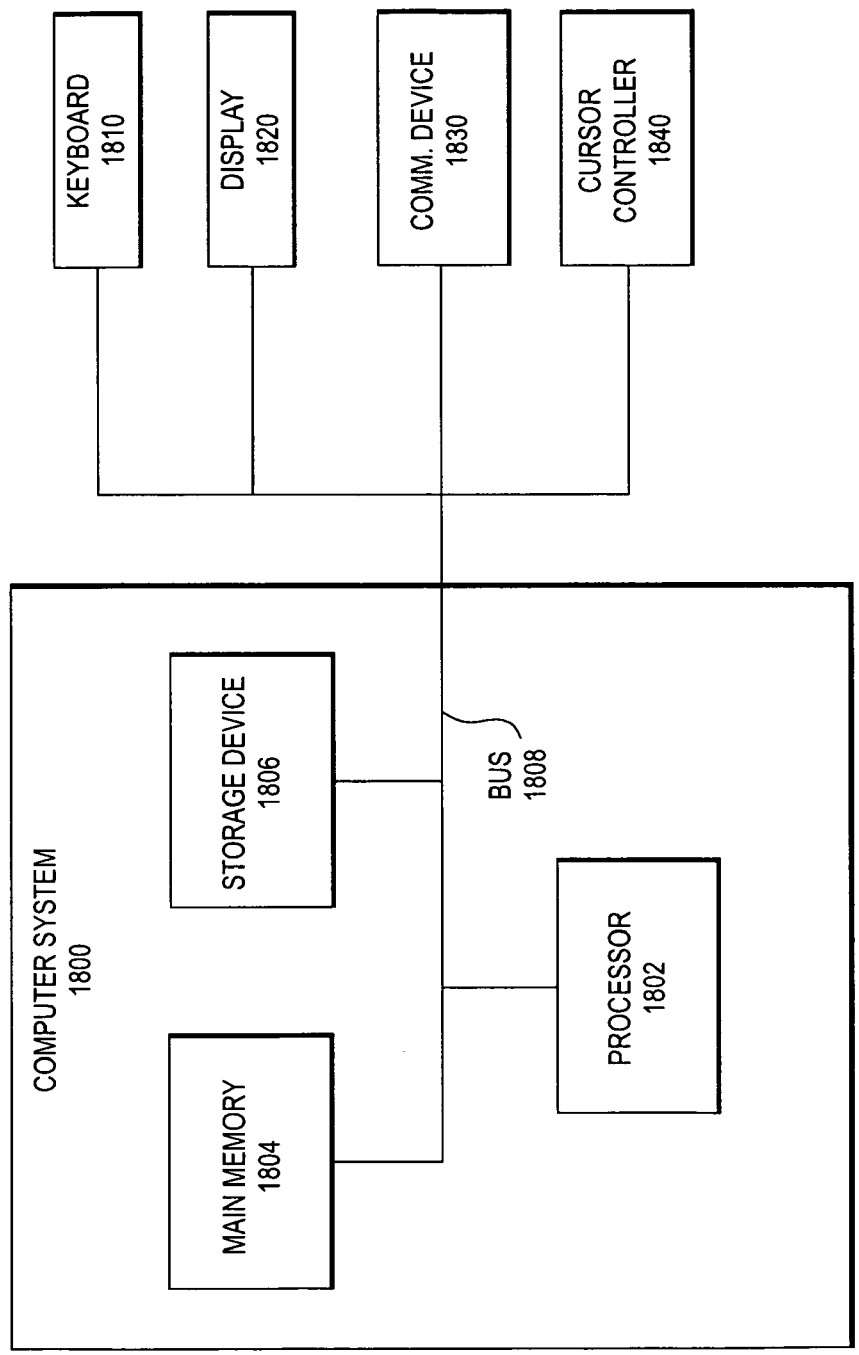
FIG. 18 illustrates a system according to one embodiment for implementing one or more steps of the calibration methods of the present embodiments.

FIG. 18 illustrates a system according to one embodiment for implementing one or more steps of the calibration methods of the present embodiments. The system 1800 may include various components, including, for example, a three-dimensional multi-color laser scanning system 1870 and a computer system 1880 in communication with the three-dimensional multi-color laser scanning system 1870. The three-dimensional multi-color laser scanning system 1870 may be used to scan an object 1890 that is located at some distance from the three-dimensional multi-color laser scanning system 1870. The scanning system 1870 may scan targets, and the resulting data may be processed by the computer system 1880 to calibrate color, pursuant to the present embodiments. Then an object 1890 may be scanned by the scanning system 1870, and the data may be processed by the computer system 1880, to produce a calibrated digitized image of the scanned object 1890, pursuant to the present embodiments.

Optionally, the computer system 1880 and/or the three-dimensional multi-color laser scanning system 1870 may be in communication with one or more external databases or networks (not shown), which may store the digitized scanned images. Communication between various components may be provided through, for example, conventional land line, wireless and satellite networks using, for example, the Internet, LANs, WANs or MANs. Although FIG. 18 shows the three-dimensional multi-color laser scanning system 1870 and the computer system 1880 as separate components, it will be understood by those having ordinary skill in the art that the three-dimensional multi-color laser scanning system 1870 and the computer system 1880 may be integrated into a single device.

The three-dimensional multi-color laser scanning system 1870 may include one or more laser sources, detectors, mechanisms to support and manipulate objects to be scanned, as well as other supporting infrastructure (not shown).

The computer system 1880, may include a processor 1802 that may be used to perform one or more steps of the methods of the present embodiments. The computer system 1880 may also include a main memory 1804 and a computer data storage device 1806, all of which may be coupled using a bus 1808, which facilitates communication between the components of the computer system 1880. The main memory 1804 may be, for example, a random access memory (RAM) or other dynamic storage device that stores instructions for execution by the processor 1802. The computer data storage device 1806 may store data and information used in the computer system 1880 and may comprise, for example, a hard disk drive, a floppy disk drive, a CD-ROM drive, or other types of non-volatile data storage. The computer data storage device 1806 may be used to store one or more databases of information including, for example, calibration data and statistics, algorithms, and analytical tools.

The computer system 1880 may also include various peripheral devices, including, for example, a display 1810 for displaying information about calibration procedures and related analysis. The display 1810 may display, for example, a graphical user interface for executing steps and displaying information associated with the present embodiments. Other peripheral devices (not shown) may include, for example, a keyboard, a communications device and a cursor controller, such as a computer mouse, roller ball or joystick. The keyboard and cursor controller may be used to input data into the computer system 1880. The communications device may be, for example, a modem, and may allow communication with other systems through, for example, conventional land line, wireless and satellite networks using, for example, the Internet, LANs, WANs or MANs.

It will be understood by those having ordinary skill in the art that one or more components of the computer system 1880 may be remotely located from each other. For example, the processor 1802, the main memory 1804 and the computer data storage device 1806 may be remotely located from the display 1810, and any keyboard, communications device and cursor controller. The computer system 1880 may operate, for example, on a personal computer, or other suitable computer, with 512 MB of RAM or higher using a Windows 2000 operating system, and may be programmed in C++ or other programming language.

The present embodiments may be embedded software in a hardware system to do runtime object intrinsic color calculation. Alternatively, the present embodiments may be packaged as standalone software and, for example, be utilized for scanning data post-processing.

The present embodiments may be used in multi-colored three-dimensional laser scanning systems that utilize laser triangulation. However, the embodiments are also effective, without modifications, on any type of multi-colored three-dimensional laser scanning systems as long as laser intensities can be correlated to object color reflectance, or with minor modifications, if other physical properties other than laser intensity are used for such a correlation.

The diagrams depicted herein are provided by way of example. There may be variations to these diagrams or the operations described herein without departing from the spirit of the invention. For instance, in certain cases, the operations may be performed in differing order, or operations may be added, deleted or modified.

While the invention has been described in relation to certain embodiments, it will be understood by those skilled in the art that other embodiments, and modifications to the disclosed embodiments, may be made without departing from the spirit and, scope of the invention. Changes may be made, within the purview of the appended claims, without departing from the scope and spirit of the invention in its aspects. Thus, it should be understood that the above-described embodiments have been provided by way of example rather than as a limitation of the invention and that the specification and drawing(s) are, accordingly, to be regarded in an illustrative rather than a restrictive sense. As such, the invention is not intended to be limited to the embodiments shown above but rather is to be accorded the widest scope consistent with the principles and novel features disclosed in any fashion herein.

What is claimed is:

1. A method for color calibration in a three-dimensional multi-color laser scanning system, comprising:
   a. creating a field of view (FOV) calibration look up table file, further comprising the steps of:
      scanning a FOV calibration target so that a full range of FOV of the system is covered, wherein the FOV calibration target is a white, flat bar coated with spectrolon paint;
      applying a laser power drift compensation to a first set of output laser intensity values from red, green and blue laser heads of the scanning system; and
      applying a reverse sampling algorithm to the first set of output laser intensity values to create a FOV indexed lookup table for each of the red, green and blue lasers;
   b. creating a laser intensity-color reflectance calibration profile, further comprising the steps of:
      scanning a color reflectance calibration target, wherein the color reflectance calibration target is a flat sheet, grayscale chart;
      applying a laser power drift compensation to a second set of output laser intensity values from red, green and blue laser heads of the scanning system;
      applying a FOV compensation to the second set of output laser intensity values;
      sub-sampling the second set of output laser intensity values from each of a plurality of stripes in the grayscale chart from the center of each grayscale stripe;
      averaging the sub-sampled second set of output laser intensity values from each grayscale stripe; and
      applying a polynomial least-square-fit algorithm to the averaged second set of output laser intensity values for each color laser to obtain laser intensity-color reflectance calibration profiles for each of the red, green and blue laser heads;

c. creating a laser intensity-surface normal calibration profile, further comprising the steps of:
scanning a surface normal calibration target, wherein the surface normal calibration target is a white sphere coated with barium sulphite;
applying a laser power drift compensation to a third set of output laser intensity values from red, green and blue laser heads of the scanning system;
applying a FOV compensation to the third set of output laser intensity values;
sampling the third set of output laser intensity values at 0.5 degree steps in a 0-90 degree reflection angle range of the surface normal calibration target;
averaging the third set of output laser intensity values from each sampled range to generate a representative laser intensity response to the surface normal direction changes for each laser color; and
applying a polynomial least-square-fit algorithm to the averaged third set of output laser intensity values to obtain laser intensity-surface normal calibration profiles for each of the red, green and blue laser heads; and d. calculating intrinsic color values from laser intensities, further comprising the steps of:
scanning an object;
applying a laser power drift compensation to a fourth set of output laser intensity values from red, green and blue laser heads of the scanning system;
applying a FOV compensation to the fourth set of output laser intensity values;
applying a surface normal compensation to the fourth set of output laser intensity values for each of the laser colors;
mapping the fourth set of output laser intensity values obtained from the surface normal compensation to the laser intensity-color reflectance calibration profile to obtain an object's intrinsic color reflectance value for each laser head; and
calculating the color value expressed in RGB color space from the red, green and blue intrinsic color reflectance values.

2. A method for color calibration in a three-dimensional multi-color laser scanning system, comprising:
creating a field of view (FOV) calibration look up table file, wherein a laser power drift compensation is applied to a first set of output laser intensity values from color laser heads of the scanning system;
creating a laser intensity-color reflectance calibration profile, wherein a laser power drift compensation is applied to a second set of output laser intensity values from color laser heads of the scanning system, and a FOV compensation is applied to the second set of output laser intensity values using the FOV calibration look up table file;
creating a laser intensity-surface normal calibration profile, wherein a laser power drift compensation is applied to a third set of output laser intensity values from color laser heads of the scanning system, and a FOV compensation is applied to the third set of output laser intensity values using the FOV calibration look up table file; and
calculating intrinsic color values from a fourth set of output laser intensity values, wherein a laser power drift compensation is applied to the fourth set of output laser intensity values from color laser heads of the scanning system, a FOV compensation is applied to the fourth set of output laser intensity values using the FOV calibration look up table file, and a surface normal compensation is applied to the fourth set of output laser intensity values using the laser intensity-surface normal calibration profile.

3. The method of claim 2, wherein the laser power drift compensation is achieved by using a linear regression fit analysis.

4. The method of claim 3, wherein the FOV compensation comprises the steps of:
obtaining laser intensity values from the FOV calibration lookup table for given scanning positions;
obtaining a linear regression fit equation by using the laser intensity values from the FOV calibration lookup table and the highest average intensity value from the FOV calibration target; and
determining FOV compensated laser intensity values by applying the linear regression fit equation to the output laser intensity values.

5. The method of claim 4, wherein the surface normal compensation comprises the steps of:
calculating a corresponding reflection angle for an output laser intensity value scanned at a given scanning position; and
mapping the calculated reflection angle to the laser intensity-surface normal calibration profile to obtain a surface normal compensated laser intensity value.

6. The method of claim 5, wherein the first set of output laser intensity values correspond to a first set of laser intensities received from a scanned FOV calibration target.

7. The method of claim 6, wherein the FOV calibration target is a white, flat bar coated with spectrolon paint.

8. The method of claim 5, wherein the second set of output laser intensity values correspond to a second set of laser intensities received from a scanned color reflectance calibration target.

9. The method of claim 8, wherein the color reflectance calibration target is a flat sheet, grayscale chart.

10. The method of claim 5, wherein the third set of output laser intensity values correspond to a third set of laser intensities received from a scanned surface normal calibration target.

11. The method of claim 10, wherein the surface normal calibration target is a white sphere coated with barium sulphite.

12. The method of claim 5, wherein the fourth set of output laser intensity values correspond to a fourth set of laser intensities received from a scanned object.

13. A method for color calibration in a three-dimensional multi-color laser scanning system, comprising
scanning an object with the scanning system, wherein the scanning system scans the object with color laser heads;
receiving laser intensities from the scanned object, wherein the received laser intensities correspond to laser intensity values;
calibrating the laser intensity values to compensate for at least one of:
laser power drift fluctuations affecting the received laser intensities,
FOV scanning position changes affecting the received laser intensities, and
surface normal directions affecting the received laser intensities; and
calculating one or more color values of the scanned object using the calibrated laser intensity values;
wherein the step of calibrating laser intensity values to compensate for laser power drift fluctuations, comprises applying a laser power drift compensation to the laser intensity values, wherein the laser power drift compensation is achieved by using a linear regression fit analysis; and wherein the step of calibrating the laser intensity values to compensate for FOV scanning position changes, comprises applying a FOV compensation to the laser intensity values, further comprising the steps of:
obtaining laser intensity values from a FOV calibration lookup table for given scanning positions;
obtaining a linear regression fit equation by using the laser intensity values from the FOV calibration lookup table and the highest average intensity value from the FOV calibration target; and
determining FOV compensated laser intensity values by applying the linear regression fit equation to the laser intensity values.

14. The method of claim 13, wherein the FOV calibration look up table is created by the steps comprising:
scanning a FOV calibration target so that a full range of FOV of the scanning system is covered;
applying a laser power drift compensation to a set of output laser intensity values from the color laser heads of the scanning system; and
applying a reverse sampling algorithm to the set of output laser intensity values to create a FOV indexed lookup table for each of the color lasers.

15. The method of claim 13, wherein the step of calibrating the laser intensity values to compensate for surface normal directions, comprises:
applying a surface normal compensation to the laser intensity values, further comprising the steps of:
calculating a corresponding reflection angle for a laser intensity value scanned at a given scanning position; and
mapping the calculated reflection angle to a laser intensity-surface normal calibration profile to obtain a surface normal compensated laser intensity value.

16. The method of claim 15, wherein the laser intensity-surface normal calibration profile is created by the steps comprising:
scanning a surface normal calibration target;
applying a laser power drift compensation to a set of output laser intensity values from the color laser heads of the scanning system;
applying a FOV compensation to the set of output laser intensity values;
sampling the set of output laser intensity values at 0.5 degree steps in a 0-90 degree reflection angle range of the surface normal calibration target;
averaging the set of output laser intensity values from each sampled range to generate a representative laser intensity response to the surface normal direction changes for each laser color; and
applying a polynomial least-square-fit algorithm to the averaged set of output laser intensity values to obtain laser intensity-surface normal calibration profiles for each of the color laser heads.

17. The method of claim 15, wherein the step of calculating one or more color values, comprises:
mapping the laser intensity values obtained from the surface normal compensation to a laser intensity-color reflectance calibration profile to obtain the scanned object's intrinsic color reflectance value for each laser head; and
calculating the color value expressed in RGB color space from red, green and blue intrinsic color reflectance values.

18. The method of claim 17, wherein the laser intensity-color reflectance profile is created by the steps comprising:
scanning a color reflectance calibration target, wherein the color reflectance calibration target is a flat sheet, grayscale chart;
applying a laser power drift compensation to a set of output laser intensity values from the color laser heads of the scanning system;
applying a FOV compensation to the set of output laser intensity values;
sub-sampling the set of output laser intensity values from each of a plurality of stripes in the grayscale chart from the center of each grayscale stripe;
averaging the sub-sampled second set of output laser intensity values from each grayscale stripe; and
applying a polynomial least-square-fit algorithm to the averaged second set of output laser intensity values for each color laser to obtain laser intensity-color reflectance calibration profiles for each of the color laser heads.

19. A computer readable medium encoded with a plurality of processor-executable instructions for implementing a computerized method for color calibration in a three-dimensional multi-color laser scanning system, the instructions comprising the steps of:
scanning an object with the scanning system, wherein the scanning system scans the object with color laser heads;
receiving laser intensities from the scanned object, wherein the received laser intensities correspond to laser intensity values;
calibrating the laser intensity values to compensate for at least one of:
laser power drift fluctuations affecting the received laser intensities,
FOV scanning position changes affecting the received laser intensities, and
surface normal directions affecting the received laser intensities; and
calculating one or more color values of the scanned object using the calibrated laser intensity values;
wherein the step of calibrating laser intensity values to compensate for laser power drift fluctuations, comprises applying a laser power drift compensation to the laser intensity values, wherein the laser power drift compensation is achieved by using a linear regression fit analysis;
wherein the step of calibrating the laser intensity values to compensate for FOV scanning position changes, comprises applying a FOV compensation to the laser intensity values, further comprising the steps of:
obtaining laser intensity values from a FOV calibration lookup table for given scanning positions;
obtaining a linear regression fit equation by using the laser intensity values from the FOV calibration lookup table and the highest average intensity value from the FOV calibration target; and
determining FOV compensated laser intensity values by applying the linear regression fit equation to the laser intensity values.

20. The computer readable medium of claim 19, wherein the FOV calibration look up table is created by the steps comprising:
scanning a FOV calibration target so that a full range of FOV of the scanning system is covered;
applying a laser power drift compensation to a set of output laser intensity values from the color laser heads of the scanning system; and applying a reverse sampling algorithm to the set of output laser intensity values to create a FOV indexed lookup table for each of the color lasers.

21. The computer readable medium of claim 20, wherein the step of calibrating the laser intensity values to compensate for surface normal directions, comprises:
   applying a surface normal compensation to the laser intensity values, further comprising the steps of:
   calculating a corresponding reflection angle for a laser intensity value scanned at a given scanning position; and
   mapping the calculated reflection angle to a laser intensity-surface normal calibration profile to obtain a surface normal compensated laser intensity value.

22. The computer readable medium of claim 21, wherein the laser intensity-surface normal calibration profile is created by the steps comprising:
   scanning a surface normal calibration target;
   applying a laser power drift compensation to a set of output laser intensity values from the color laser heads of the scanning system;
   applying a FOV compensation to the set of output laser intensity values;
   sampling the set of output laser intensity values at 0.5 degree steps in a 0-90 degree reflection angle range of the surface normal calibration target;
   averaging the set of output laser intensity values from each sampled range to generate a representative laser intensity response to the surface normal direction changes for each laser color; and
   applying a polynomial least-square-fit algorithm to the averaged set of output laser intensity values to obtain laser intensity-surface normal calibration profiles for each of the color laser heads.

23. The computer readable medium of claim 21, wherein the step of calculating one or more color values, comprises:
   mapping the laser intensity values obtained from the surface normal compensation to a laser intensity-color reflectance calibration profile to obtain the scanned object's intrinsic color reflectance value for each laser head; and
   calculating the color value expressed in RGB color space from red, green and blue intrinsic color reflectance values.

24. The computer readable medium of claim 23, wherein the laser intensity-color reflectance profile is created by the steps comprising:
   scanning a color reflectance calibration target, wherein the color reflectance calibration target is a flat sheet, grayscale chart;
   applying a laser power drift compensation to a set of output laser intensity values from the color laser heads of the scanning system;
   applying a FOV compensation to the set of output laser intensity values;
   sub-sampling the set of output laser intensity values from each of a plurality of stripes in the grayscale chart from the center of each grayscale stripe;
   averaging the sub-sampled second set of output laser intensity values from each grayscale stripe; and
   applying a polynomial least-square-fit algorithm to the averaged second set of output laser intensity values for each color laser to obtain laser intensity-color reflectance calibration profiles for each of the color laser heads.

25. A system for color calibration in a three-dimensional multi-color laser scanning system, comprising:
   a scanning system; and
   a computer system, in communication with the scanning system, programmed to implement a method for color calibration in the scanning system, comprising:
      a memory for storing instructions; and
      a processor in communication with the memory, the processor operative to utilize the instructions stored in the memory for executing the method, comprised of the steps:
         scanning an object with the scanning system, wherein the scanning system scans the object with color laser heads;
         receiving laser intensities from the scanned object, wherein the received laser intensities correspond to laser intensity values;
         calibrating the laser intensity values to compensate for at least one of:
            laser power drift fluctuations affecting the received laser intensities,
            FOV scanning position changes affecting the received laser intensities, and
            surface normal directions affecting the received laser intensities; and
         calculating one or more color values of the scanned object using the calibrated laser intensity values;
   wherein the step of calibrating laser intensity values to compensate for laser power drift fluctuations, comprises applying a laser power drift compensation to the laser intensity values, wherein the laser power drift compensation is achieved by using a linear regression fit analysis;
   wherein the step of calibrating the laser intensity values to compensate for FOV scanning position changes, comprises applying a FOV compensation to the laser intensity values, further comprising the steps of:
      obtaining laser intensity values from a FOV calibration lookup table for given scanning positions;
      obtaining a linear regression fit equation by using the laser intensity values from the FOV calibration lookup table and the highest average intensity value from the FOV calibration target; and
      determining FOV compensated laser intensity values by applying the linear regression fit equation to the laser intensity values.

26. The system of claim 25, wherein the FOV calibration look up table is created by the steps comprising:
   scanning a FOV calibration target so that a full range of FOV of the scanning system is covered;
   applying a laser power drift compensation to a set of output laser intensity values from the color laser heads of the scanning system; and
   applying a reverse sampling algorithm to the set of output laser intensity values to create a FOV indexed lookup table for each of the color lasers.

27. The system of claim 25, wherein the step of calibrating the laser intensity values to compensate for surface normal directions, comprises:
   applying a surface normal compensation to the laser intensity values, further comprising the steps of:
   calculating a corresponding reflection angle for a laser intensity value scanned at a given scanning position; and
   mapping the calculated reflection angle to a laser intensity-surface normal calibration profile to obtain a surface normal compensated laser intensity value.

28. The system of claim 27, wherein the laser intensity-surface normal calibration profile is created by the steps comprising:

- scanning a surface normal calibration target;
- applying a laser power drift compensation to a set of output laser intensity values from the color laser heads of the scanning system;
- applying a FOV compensation to the set of output laser intensity values;
- sampling the set of output laser intensity values at 0.5 degree steps in a 0-90 degree reflection angle range of the surface normal calibration target;
- averaging the set of output laser intensity values from each sampled range to generate a representative laser intensity response to the surface normal direction changes for each laser color; and
- applying a polynomial least-square-fit algorithm to the averaged set of output laser intensity values to obtain laser intensity-surface normal calibration profiles for each of the color laser heads.

29. The system of claim 27, wherein the step of calculating one or more color values, comprises:

- mapping the laser intensity values obtained from the surface normal compensation to a laser intensity-color reflectance calibration profile to obtain the scanned object's intrinsic color reflectance value for each laser head; and
- calculating the color value expressed in RGB color space from red, green and blue intrinsic color reflectance values.

30. The system of claim 29, wherein the laser intensity-color reflectance profile is created by the steps comprising:

- scanning a color reflectance calibration target, wherein the color reflectance calibration target is a flat sheet, grayscale chart;
- applying a laser power drift compensation to a set of output laser intensity values from the color laser heads of the scanning system;
- applying a FOV compensation to the set of output laser intensity values;
- sub-sampling the set of output laser intensity values from each of a plurality of stripes in the grayscale chart from the center of each grayscale stripe;
- averaging the sub-sampled second set of output laser intensity values from each grayscale stripe; and
- applying a polynomial least-square-fit algorithm to the averaged second set of output laser intensity values for each color laser to obtain laser intensity-color reflectance calibration profiles for each of the color laser heads.

* * * * *